United States Patent
Flunkert et al.

(10) Patent No.: US 11,599,927 B1
(45) Date of Patent: Mar. 7, 2023

(54) ARTIFICIAL INTELLIGENCE SYSTEM USING DEEP NEURAL NETWORKS FOR PAIRWISE CHARACTER-LEVEL TEXT ANALYSIS AND RECOMMENDATIONS

(71) Applicant: Amazon Technologies, Inc., Seattle, WA (US)

(72) Inventors: Valentin Flunkert, Berlin (DE); Weiwei Cheng, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 1155 days.

(21) Appl. No.: 15/873,684

(22) Filed: Jan. 17, 2018

(51) Int. Cl.
| | |
|---|---|
| *G06Q 30/06* | (2012.01) |
| *G06Q 30/0601* | (2023.01) |
| *G06N 20/00* | (2019.01) |
| *G06F 40/10* | (2020.01) |
| *G06F 40/30* | (2020.01) |

(52) U.S. Cl.
CPC ......... *G06Q 30/0631* (2013.01); *G06F 40/10* (2020.01); *G06F 40/30* (2020.01); *G06N 20/00* (2019.01)

(58) Field of Classification Search
CPC ..... G06Q 30/0631; G06F 40/10; G06F 40/30; G06N 20/00; G06N 3/02
USPC .......................................................... 715/106
See application file for complete search history.

(56) References Cited

U.S. PATENT DOCUMENTS

| | | | |
|---|---|---|---|
| 7,295,995 B1 | 11/2007 | York et al. | |
| 7,590,562 B2 | 9/2009 | Stoppelman | |
| 7,617,164 B2 * | 11/2009 | Burges | G06N 20/00 |
| | | | 706/15 |
| 7,783,528 B2 | 8/2010 | Stoppelman | |
| 7,809,601 B2 | 10/2010 | Shaya et al. | |
| 7,831,439 B1 | 11/2010 | Bryar et al. | |
| 9,418,375 B1 * | 8/2016 | Cunico | G06Q 30/0282 |
| 2002/0161664 A1 * | 10/2002 | Shaya | G06Q 30/0254 |
| | | | 705/7.31 |
| 2009/0265290 A1 * | 10/2009 | Ciaramita | G06N 3/08 |
| | | | 706/12 |
| 2013/0073430 A1 | 3/2013 | Gallen et al. | |
| 2014/0324626 A1 * | 10/2014 | Klink | G06Q 30/0631 |
| | | | 705/26.8 |
| 2015/0262286 A1 | 9/2015 | Cypher et al. | |
| 2015/0278441 A1 * | 10/2015 | Min | G16B 20/00 |
| | | | 706/12 |
| 2015/0339759 A1 * | 11/2015 | Pope | G06Q 30/0631 |
| | | | 705/26.62 |

(Continued)

OTHER PUBLICATIONS

Vadim Smolyakov, Ensemble Learning to Improve Machine Learning Results; Aug. 22, 2017; blog.statsbot.co; pp. 1-11.*

(Continued)

*Primary Examiner* — Andrew R Dyer
(74) *Attorney, Agent, or Firm* — Robert C. Kowert; Kowert, Hood, Munyon, Rankin & Goetzel, P.C.

(57) ABSTRACT

At an artificial intelligence system, a respective feature set is generated from individual text collections pertaining to an item, using a first machine learning model which is trained to perform character-level analysis. Using at least a portion of a second machine learning model, a score associated with a semantic criterion is generated for an item; the training input to the second model is based on the feature sets. A recommendation associated with the item is generated based on the score.

20 Claims, 12 Drawing Sheets

(56) References Cited

U.S. PATENT DOCUMENTS

| | | | |
|---|---|---|---|
| 2016/0260161 A1* | 9/2016 | Atchley | H04N 13/282 |
| 2016/0267377 A1* | 9/2016 | Pan | G06Q 30/0201 |
| 2016/0321735 A1* | 11/2016 | Huang | G06Q 30/0631 |
| 2016/0328661 A1* | 11/2016 | Reese | G06N 3/0445 |
| 2017/0140262 A1* | 5/2017 | Wilson | G06Q 30/0282 |
| 2017/0220986 A1* | 8/2017 | Putcha | G06Q 20/102 |
| 2018/0052884 A1* | 2/2018 | Kale | G06F 16/24578 |
| 2018/0165746 A1* | 6/2018 | Huang | G06F 16/9038 |
| 2018/0218430 A1* | 8/2018 | Prendki | G06Q 30/0631 |
| 2018/0218431 A1* | 8/2018 | Prendki | G06Q 30/0631 |
| 2018/0218433 A1* | 8/2018 | Penner | G06N 20/00 |
| 2018/0268548 A1* | 9/2018 | Lin | G06N 3/084 |
| 2018/0285065 A1* | 10/2018 | Jeong | G06F 3/167 |
| 2018/0293515 A1* | 10/2018 | Prokopenya | G06F 16/285 |
| 2018/0374138 A1* | 12/2018 | Mohamed | G06N 20/00 |
| 2019/0012723 A1* | 1/2019 | Chen | G06Q 30/0639 |
| 2019/0073420 A1* | 3/2019 | Agapiev | G06F 16/9024 |
| 2019/0114566 A1 | 4/2019 | Lapierre | |
| 2019/0122141 A1* | 4/2019 | Zhen | G06N 3/082 |
| 2019/0129732 A1* | 5/2019 | Sivertson | G06F 8/433 |
| 2019/0188218 A1* | 6/2019 | Harris | G06N 3/08 |
| 2019/0205382 A1* | 7/2019 | Raux | G06F 40/30 |
| 2019/0236681 A1* | 8/2019 | Konik | G06F 16/3325 |
| 2020/0167834 A1* | 5/2020 | Matsuoka | G06N 3/08 |

OTHER PUBLICATIONS

Megan Speir; Gifted, Artificial Intelligence to Hack Gift Giving; Dec. 20, 2016; twilio.com; pp. 1-9.*

Rajani S, M. Hanumanthappa; Techniques of Semantic Analysis for Natural Language Processing—a Detailed Survey; Oct. 2, 2016; International Journal of Advanced Research in Computerand Communication Engineering; vol. 5; Special Issue 2; pp. 1-4.*

Sariel Har-Peled, et al., "Constraint Classification for Multiclass Classification and Ranking," International Conference an Algorithmic Learning Theory, Nov. 8, 2002, pp. 1-8.

Ben Krause, et al., "Multiplicative LSTM for sequence modelling," Oct. 25, 2016, Workshop track—ICLR 2017, pp. 1-13.

Gerald Tesauro, "Connectionist Learning of Expert Preferences by Comparison Training," IBM Thomas J. Watson Research Center, 1988, pp. 99-106.

U.S. Appl. No. 15/688,681, filed Aug. 28, 2017, Weiwei Cheng.

"Who are you shopping for?", downloaded from https://www.amazon.com/gp/gift-finder?ageGroup=adult-neutral&showBubbles=true on Aug. 13, 2017, pp. 1-6.

Alec Radford, et al. "Learning to Generate Reviews and Discovering Sentiment," OpenAI, San Francisco, CA, Apr. 6, 2017, pp. 1-9.

D. Sculley, et al., "Combined Regression and Ranking," ACM, KDD'10, Jul. 25-28, 2010, Washington, DC, pp. 1-9.

Eyke Hullermeier, et al., "Label ranking by learning pairwise preferences," Artificial Intelligence 172 (2008), pp. 1897-1916.

* cited by examiner

ARTIFICIAL INTELLIGENCE SYSTEM USING DEEP NEURAL NETWORKS FOR PAIRWISE CHARACTER-LEVEL TEXT ANALYSIS AND RECOMMENDATIONS

BACKGROUND

In recent years, more and more of the items purchased by the general public are being bought online. Some e-retail organizations which sell a variety of items such as electronic devices, books, clothing, household items, and the like may have large inventories comprising millions of items. In many cases, the number of items available, even within a given category such as a particular type of clothing, may be quite large. An almost limitless amount of research and comparison may be possible online when searching for items to purchase, sometimes making it difficult for a potential consumer to select which specific item should be bought for a particular purpose. In some cases, a variety of text and/or graphical information may be available regarding various items, which may collectively contain, at least in principle, semantic information which may indicate the suitability of the items for various purposes such as gifting. However, extracting the semantic information and providing it to potential item consumers to help them identify items for a given purpose or occasion may not be straightforward.

This item selection problem is even more of an issue when a gift is to be purchased, as the response of the gift receiver to the gift may often have a higher level of emotional significance to a potential gift purchaser than is associated with the purchase of non-gift items. This may be especially true for the many special occasions during a year in which people are expected to purchase gifts—e.g., seasonal holidays, birthdays, days set aside to honor one's parents, and so on. Of course, it may not be straightforward to predict the extent to which a gift receiver is likely to have a positive response to a gift; what constitutes a "good" gift is highly subjective and often varies from person to person. Even for a particular person, the characteristics that may make a given item suitable as a gift may vary over time, or even with the current mood of the person. Furthermore, for a gift purchase to be considered successful, needs of both the gift giver (e.g., budget limits, timing constraints with respect to the delivery of the gift, etc.) and the gift receiver may have to be satisfied.

Many e-retail organizations may attempt to generate recommendations for various types of purchases in order to help with the item selection problem. In many cases, however, generic recommendations by themselves may not be straightforward for potential item consumers to interpret, and may therefore not be very convincing.

Figure 1:
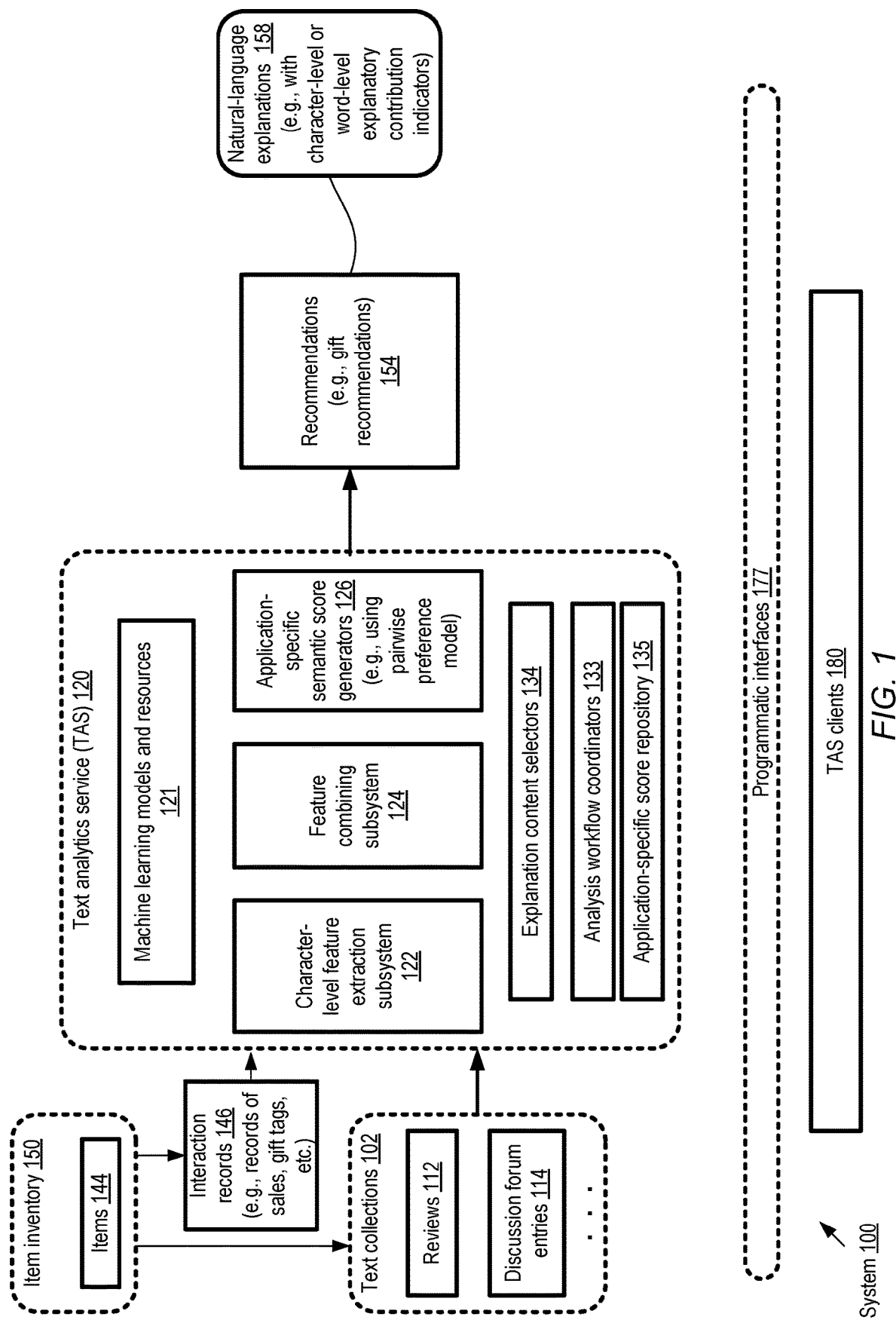
FIG. 1 illustrates an example system environment in which a text analytics service which generates recommendations based on character-level analysis of text information pertaining to various items may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for a text analytics service which may be used to generate various types of recommendations regarding a plurality of items, including but not limited to gift-giving recommendations, together with natural language explanations for the recommendations, are described. In some embodiments, one or more machine learning models which analyze text collections at a character-level granularity may be employed in the process of generating the recommendations and/or the accompanying explanations. In one embodiment, one or more of the techniques described herein may be implemented at a network-accessible service, e.g., in a provider network or public cloud environment.

In much of the following description, recommendations regarding the suitability of items as gifts are presented as one example of the kinds of recommendations which may be generated using the text analytics service. It is noted, however, that the use of the techniques is not restricted to the gift-selection context—in at least some embodiments, for example, the techniques may be used with equal success for recommending items based on fine-grained semantic analysis for various other purposes, such as for personal use, taking on travel trips, and so on. Generally speaking, the methodology described herein may be employed in various contexts in which relative rankings of various items are to be obtained using available text information (such as reviews indicative of preferences of previous users/consumers regarding the items) or using available information in other natural language formats such as utterances which may be converted to text, and in which natural language explanations of the relative rankings may be helpful to potential item consumers or purchasers.

According to some embodiments, a respective set of one or more text collections, such as one or more user-generated reviews (which may have originally been generated in text format, or may have been converted/transcribed into text from some other format), may be obtained corresponding to individual ones of a plurality of items. The items may, for example, belong to an inventory or catalog of an e-retailing organization in some embodiments. Using a first machine learning model trained to generate character-level predictions of text sequences, a respective feature set corresponding to individual text collections may be obtained in various embodiments. The feature set for a given text collection may, for example, comprise a high-dimensional vector of numeric values generated at a hidden layer of a language model which employs a neural network in some embodiments. In one embodiment, the respective feature sets of various text collections available for a given item may be combined or aggregated using any of various approaches— e.g., if a hundred user-generated reviews are available for a given item, a respective feature set may be generated for the hundred reviews using the character-level prediction model, and then the hundred feature sets may be combined to obtain an aggregated feature set.

Corresponding to various items, respective scores or metrics with respect to one or more semantic criteria (such as the suitability of an item as a gift for a particular demographic or individual) may be generated or predicted using at least a portion of another machine learning model in various embodiments. This machine learning model may comprise, for example, a pairwise preference learning model whose training set is based at least in part on the items' feature sets. The training set may also include consumers' item preference indicators obtained from a variety of sources such as records of user interactions in some embodiments. Using a score generated for a particular item, a recommendation, such as a gift-giving recommendation with respect to the particular item may be produced—e.g., indicating that the item is likely to be received positively as a gift by some targeted recipient. In at least some embodiments, for one or more applications, respective semantic scores generated for a plurality of items may be stored in advance in the repository 135, and used later to respond to queries from clients 180.

In at least some embodiments, the recommendation may be accompanied by a corresponding explanation, expressed in natural language. For example, in some embodiments in which item reviews were used to generate the feature sets, an explanation may comprise at least a portion of a review which appears to justify the recommendation. In at least some embodiments, the explanation may be represented or shown in such a way (e.g., using highlighting, font changes, font colors or the like) that an explanatory contribution of a particular character or word within the review, relative to other characters or words, may be indicated. The explanations, and the prominence given to terms with relatively greater contributions to the explanations, may result in several types of technical advantages in various embodiments. For example, TAS clients 180 may be able to make decisions more quickly and with a higher degree of confidence than if no explanations were provided, or if explanations were provided without highlighting important terms, which may result in a reduction in the total number of network interactions required between the clients and a service for which recommendations are generated, and/or a reduction in the amount of processing that has to be performed at the service. Furthermore, for example in a scenario in which gifting-related recommendations and explanations are generated, the overall quality of the user experience of the clients may be improved as a result of the real-time presentation of highly relevant explanations and recommendations. In various embodiments, character-level analysis of the kind described may further help to improve the ability of computing devices of a text analytics service to display information and interact with a user. The techniques described may help resolve a number of problems encountered using some types of user interfaces in the context of item purchases, such as problems relating to speed, accuracy, usability, content suitability (e.g., parental controls), and may at least in some cases help eliminate doubts an online customer may have about purchasing an item online. In at least some embodiments, the character-level analysis may also help optimize the use of available presentation space at various kinds of presentation devices such as smart phones, tablets and the like that may be used to provide recommendations and/or explanations by application clients. For example, from among thousands of possible reviews which may be used for explanations, in some embodiments character-level analysis may help the task analytics service identify the top few reviews that are likely to be most convincing to a given item consumer, and the limited space available on a consumer's phone may be utilized to display those top few reviews. A wide variety of presentation devices and associated interfaces (e.g., graphical user interfaces, web-based interfaces, text interfaces and the like) may be used to present recommendations 154 and/or natural language explanations 158 to TAS clients in different embodiments.

Any of a variety of machine learning models and/or algorithms may be employed in different embodiments for feature set generation, combining feature sets for the different text collections associated with an item, generating the semantic scores that are used to provide recommendations, and/or for identifying natural language explanations and determining the relative significance of particular sections of the natural language explanations. For example, in various embodiments, a machine learning model used in some part of the recommendation workflow may comprise a recurrent neural network model (such as a neural network model comprising one or more multiplicative long short-term memory (mLSTM) units), and/or a convolutional neural network model. In one embodiment, as mentioned above, a character-level feature set for a text collection may be obtained from a hidden layer of a neural network-based language model.

In at least one embodiment, machine learning models and algorithms may be employed in at least two modes: a preparatory or offline mode, and a real-time mode. In the preparatory or offline mode, respective scores of a plurality of items of an inventory with respect to one or more semantic criteria may be generated using a combination of one or more models, and stored in a repository. In the real-time mode, a query (such as a search request for good gifts for some individual or group) may be received via a programmatic interface from a client of a service providing access to the items. In response to the query, a recommendation regarding one or more of the items may be provided by obtaining corresponding previously-generated scores of the items from the repository in some embodiments. To provide a natural language explanation for the recommendation, an input data set that was used to generate feature sets for a recommended item may be identified, and at least one machine learning model to which the input data set was provided as input may be re-run or re-executed. Results of the re-executed model(s) may be used to highlight portions of the text of the input data that provide a justification or explanation for the recommendation in at least some embodiments.

According to some embodiments, one or more of the machine learning models discussed above may also or instead be used to provide, in real time, information that may be relevant to text input being provided by a client of a network-accessible service. For example, the submission of one or more text characters via a text entry portion of a programmatic interface (such as an interface which may be used to submit questions about items, such as "Does item A work well for purpose P?" or "How long does it take to re-charge item B?") associated with at least a portion of an item inventory may be detected, e.g., before the individual that is submitting the text has completed their entry. The detected characters may be provided as input to one or more of the machine learning models. A result obtained from the machine learning model (s) may be used to identify one or more stored text collections which meet a relevance criterion associated with the characters that were detected. For example, in a scenario in which a potential or actual user begins typing in a question about an item (such as the words "How long do" of the question "How long do the batteries last" with respect to an electronics item), the machine learning models may be able to identify answers relevant to the question even before the question has been fully entered. One or more relevant text collections identified using the machine learning models may be provided to the individual entering the text via another portion of the programmatic interface in some embodiments—e.g., in an "answers" portion of the web page being used to submit a question. Such rapid presentation of highly relevant information in real time may save time for the individual entering text, and may also reduce overall resource needs (e.g., CPU needs or networking needs) at the service with which the individual is interacting in at least some embodiments.

In at least one embodiment in which the machine learning models are used to obtain information about the relative significance of individual characters and/or words within a sequence of words, such as an explanation for a recommendation, the indication of the relative significance may be provided via an audio interface, e.g., by a voice-driven assistant device. For example, a word with a character for which a significance score exceeds a threshold may be voiced more loudly than other nearby words of the sequence, or in a different tone that other nearby words.

According to some embodiments in which text analytics is to be used for gift-related recommendations, a collection of items (such as all the items of an inventory or catalog, or some selected subset of the inventory/catalog) to be evaluated as possible gifts may be identified. The gift-related needs or requirements of at least one of two sets of entities may be considered in at least some embodiments: the recipients or targets of the gifts, and the givers or sources of the gifts. A gifting-related ranking (such as a partial order, or a pairwise ordering) or ordered arrangement of numerous items of a catalog or inventory may be obtained in various embodiments, e.g., using records indicating whether individual ones of the items were purchased as a gift or not, and/or using curated gifting advice information that may have been generated for at least a subset of the items. Using the gifting-related ranking information and feature sets obtained from character-level analysis of reviews and other text collections, one or more machine learning models may be trained in some embodiments to generate gift-suitability scores for items. The terms "gift-suitability" and "giftability" may be used interchangeably in some embodiments to refer to the extent to which a given item is estimated to be successful when presented as a gift. In some embodiments, information about the target demographic or group of recipients for which the gift-suitability score is to be generated for an item may be included in the input supplied to the model(s), or otherwise represented in the model(s). In other embodiments, respective versions of the model(s) may be trained for different target/recipient groups. In various embodiments, based at least in part on the gift-suitability score (generated by the machine learning model(s)) corresponding to a particular item, a gift-giving recommendation indicating the item as a candidate gift may be generated and provided to one or more entities and/or destinations, together with some reasoning or explanation expressed in natural language. In some such embodiments, for example, the explanations may be extracted from or based at least partly on reviews or other user-generated text content that was collected for the item (and at least in some cases represented in the features generated for the item).

Any of a number of approaches may be taken towards generating the gifting-related ordering or ranking information in different embodiments. In one embodiment, for example, when purchasing an item from an online catalog or e-retailing establishment, a consumer or purchaser may directly or indirectly indicate whether the item is being purchased as a gift. Such direct or indirect indications may be referred to as gifting records in various embodiments. Direct indications may for example include simply marking/labeling the item as a gift, while indirect indications may for example be provided by selecting a gift-wrapping option, choosing a shipping address of a family member or friend to whom gifts have been sent previously, and so on. As a result, at least in those cases in which the purchasers indicate that some item is being purchased with the intention of gifting, a record of the intention may be generated and stored, as well records associated with non-gifting purchases of the item. In some embodiments, for at least some items, a respective gifting-to-purchasing ratio may be computed by, for example, dividing the number of times the item was purchased for gifting in some selected time period, by the total number of times the item was purchased during that time period. A gifting-related ranking or ordering of the items may then be generated based on their gifting-to-purchasing ratios in such embodiments, e.g., under the assumption that the more frequently an item was purchased as a gift in the past, the better suited it is to be recommended as a gift in the future. Note that, as the gifting-to-purchasing ratio at best captures the stated/indicated intention of the purchaser of the item, and does not provide explicit feedback about how much the recipient liked the item (or even if a recipient actually received the item), this ratio may be considered an approximation regarding the potential success of an item as a gift in various embodiments. In some embodiments, additional records collected at the entity from which the items are purchased, such as records of item returns, may be used in combination with the gifting-to-purchasing records to help rank or order items as gifts.

Several different types of interfaces may be used to provide the gift recommendations and accompanying explanations in some embodiments. For example, in one embodiment, a network-accessible gift recommendation service (which in turn utilizes a text analytics service of the kind discussed above) may implement one or more programmatic interfaces, such as a web-based console, a graphical user interface, command-line tools and/or a set of application programming interfaces which can be used by clients to submit requests and receive responses. In such an embodiment, a client may submit a gift recommendation request via a programmatic interface and receive a list of one or more candidate items that are recommended. In some embodiments, individuals or organizations that manage their own inventories or catalogs may wish to improve their own inventories, and such clients may submit requests to the gift recommendation service and receive suggestions for items to be included in (or excluded from) their inventories. In at least one embodiment, a gift recommendation service employing the data-driven approaches indicated above may be used transparently by an e-retailer—e.g., a gift suggestions web page or similar interface may be used to expose the recommendations generated by the service to various potential customers of the e-retailer, without necessarily indicating that a gift-recommendation service or a text analytics service is being used. In some embodiments, gift recommendations generated by the service may be provided in non-visual formats—e.g., recommendations for items suitable as gifts may be provided in audio form via a voice-driven personal assistant device. The output of the gift recommendation service may be used in several other ways in some embodiments, e.g., to help organize the contents of seasonal catalogs, to organize advertisement contents, and so on.

Example System Environment

FIG. 1 illustrates an example system environment in which a text analytics service which generates recommendations based on character-level analysis of text information pertaining to various items may be implemented, according to at least some embodiments. As shown, in system 100, a text analytics service (TAS) 120 may include, among other components and artifacts, one or more analysis workflow coordinators 133, a character-level feature extraction subsystem 122, a feature combining subsystem 124, one or more application-specific semantic score generators 126, explanation content selectors 134, a set of machine learning models and resources 121 and/or an application-specific score repository 135 in the depicted embodiment. The machine learning models and resources 121 may include computing, storage and other resources that can be used to train and execute a variety of model types, including for example neural network based models which may be used for feature extraction, feature processing (such as feature combining) and/or score generation as discussed below in further detail. Individual ones of the subcomponents 121, 122, 124, 126, 133, 134 and 135 may be implemented using some combination of hardware and/or software at one or more computing devices in various embodiments. In some embodiments, some of the subcomponents 121, 122, 124, 126, 133, 134 and 135 shown as logically distinct within the text analytics service 120 in FIG. 1 may not necessarily be implemented as separate entities—e.g., one or more of the subcomponents may be instantiated within a single computing device, or a single machine learning model may be used for more than one function. As implied by their name, analysis workflow coordinators 133 may be responsible in various embodiments for orchestrating the processing of text collections for various items, and for using the other resources of the service 120 to respond to various types of implicit or explicit queries or requests from clients of the service 120. In some cases, the queries or requests may be received via one or more programmatic interfaces 177, such as web-based consoles, application programming interfaces, command-line tools, graphical user interfaces and the like.

In the depicted embodiment, the text analytics service 120 may have access to several different data sources pertaining to items 144 of an inventory or catalog 150, including for example text collections 102 such as reviews 112, discussion forum entries 114, social media postings related to the items, descriptions provided by the producer of the item, and so on. A given text collection may comprise, for example, a sequence of words or tokens, with the exact manner in which the words or tokens are demarcated and expressed being dependent on the language being used. With respect to at least some items 144 of inventory 150, in some embodiments a plurality of text collections of various types (e.g., multiple reviews and/or multiple forum entries) may be available for analysis.

In some embodiments, corresponding to at least some items 144 of the inventory 150, a respective set of one or more text collections 102 may be obtained at the text analytics service. Using a machine learning model trained to generate character-level predictions of text sequences, a respective feature set corresponding to individual text collections may be extracted, e.g., at the feature extraction subsystem 122. If a given item has several associated text collections (such as multiple reviews), the feature sets corresponding to those text collections may be aggregated at the feature combining subsystem 124. One or more additional machine learning models may be trained as application-specific semantic score generators 126 in the depicted embodiment, using the aggregated features (or un-aggregated features) extracted from the text collections as part of their training data set in the depicted embodiment. In at least some embodiments, a pairwise preference model (which may comprise neural networks with shared learned parameters for the different items of a pair of items) may be used to generate scores associated with any of various types of semantic criteria. The interpretation or meaning of the scores may vary, depending on the application—e.g., for a gift recommendation application, the score assigned to an item may represent the predicted probability that the item would work well as a gift, while for an application which recommends travel accessories, the score assigned to an item may predict the probability that a traveler is likely to enjoy having the item accessible in the traveler's luggage.

After the training phase of the score generators is complete, scores produced by the score generators may be used to respond to various types of requests or queries in the depicted embodiment. In some embodiments as discussed below in further detail, only a portion of a trained pairwise preference model may be used at prediction time—e.g., values produced in an internal layer of the model may be used as scores, and the entire model may not necessarily have to be used. Depending on the application, the scores obtained from score generators 126 may be used to provide recommendations 154 (such as gift recommendations for various categories of gift recipients) associated with various items in the depicted embodiment. In addition, based at least in part on the character-level analysis performed on the text collections, one or more natural language explanations 158 (e.g., portions of relevant reviews, with certain words or characters highlighted to indicate their relative contributions to the explanation) may be provided to clients of the text analytics service 120 in various embodiments.

In some embodiments, metadata provided by item owners, such as descriptions, sizes, prices, and the like may also be used to generate features; some of the metadata elements may be in the form of unstructured or partially structured text, while other elements may be available as structured text or non-text data. Corresponding to at least some subset of the items 144 of the inventory 150, a number of consumer interaction records 146 may be stored in the depicted embodiment, e.g., in one or more repositories, by the entity responsible for managing/selling the items 144. Such repositories may contain, among other kinds of records, records of purchases, browsing history, or returns regarding the items 144, records indicating labeling or tagging of items by item purchasers as gifts, and the like. In some embodiments, as discussed below, the interaction records 146 may be used to generate ranking information regarding various types of item characteristics such as suitability of the items as gifts, and so on. Other data sources, not shown in FIG. 1 may also or instead be used for recommendation generation in some embodiments, such as curated gift guides for various segments of the potential item consumer population.

In some embodiments in which the TAS 120 is used for gift recommendations, the available interaction records may be used to generate gifting-related ranking or ordinal information which can be used to train score generators. For example, ranking information generators associated with the TAS 120 may determine, for a given item 144 and some selected time interval, the total number of times the item was marked/labeled as a gift during the purchase process, and the total number of times the item was purchased. From those two quantities, the gifting-to-purchasing ratio may be computed for various items, and this ratio may be used to rank the items, with higher gifting-to-purchasing ratios assumed to indicate items more suitable as gifts than lower gifting-to-purchasing ratio items. In at least one embodiment, instead of (or in addition to) using the gifting-to-purchasing ratios directly as the evidence of gift-suitability, one or more machine learning models (e.g., regression or classification models) may be trained to generate scores which can be used to rank items relative to one another regarding their appropriateness for use as gifts. In addition to or instead of using character-level features derived from text collections, in some embodiments other types of features representing text and/or numerical or categorical information about the items 144 may be generated and used for producing recommendations. In one embodiment, for example, N-gram counts for various N-grams encountered in the text metadata and/or reviews may be utilized as features. In one embodiment, instead of using character-level features, word-level or word-based features, part-of-speech-based or sentence-based features may be generated. In one implementation, a gift-suitability score produced with the help of semantic score generators 126 may comprise a real number between 0 and 1, with higher values of the score indicating greater anticipated suitability as a gift than lower values.

The output recommendations 154 produced with the help of the TAS 120 in the depicted embodiment may comprise, for example, respective sets of one or more ranked items which are recommended as candidate gifts for one or more target gift receivers. In different embodiments, the granularity at which recommendations are generated may differ—e.g., in some cases, gifts may be recommended at the granularity of fairly large groups (e.g., "children between 5-10 years old"), while in other cases, it may be possible to generate gift recommendations specific to much smaller groups (e.g., "adults between 25 and 30 living in city C") or even individuals. The number of items indicated in the recommendation may vary as well in some embodiments—e.g., only the top three candidate gift items may be identified for a given target gift recipient set in some embodiments, while a list of ten or twenty gifts may be generated for a target gift recipient set in other embodiments.

In embodiments in which the TAS 120 is used for gifting-related recommendations, TAS clients 180 such as potential consumers of items of inventory 150 may submit programmatic requests for recommendations via programmatic interfaces 177, and receive the responses generated by the TAS using the interfaces. Other TAS clients, such as business entities that wish to optimize their own inventories to increase sales of items as gifts, may also use the TAS's programmatic interfaces 177 in various embodiments. In at least some embodiments, the TAS 120 may form a subcomponent of a web-based retailing site—e.g., a shopping site which has gift-guide web pages (similar in concept to the example web page shown in FIG. 5) whose content is generated with the help of the TAS.

Character-Level Feature Extraction

Figure 2:
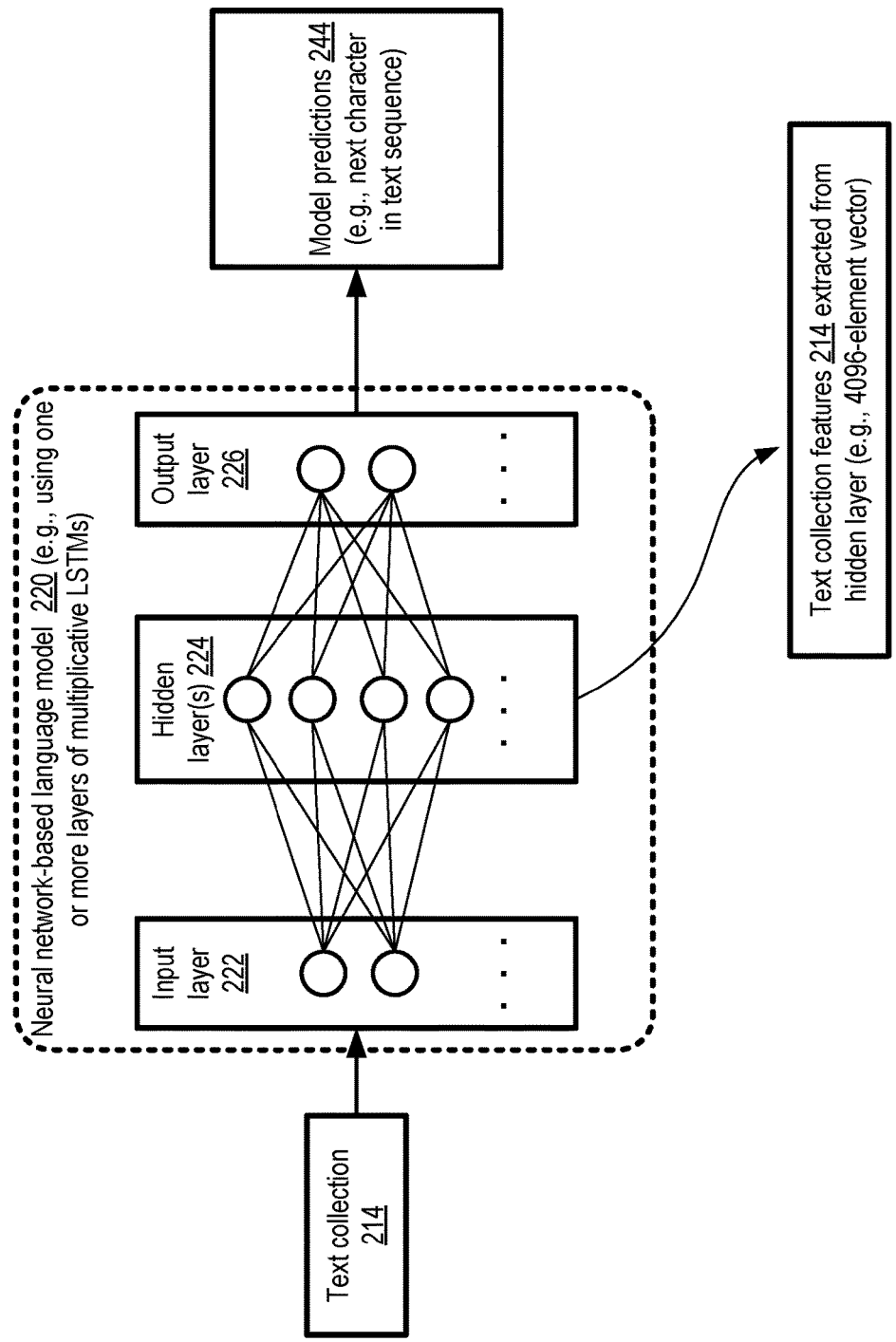
FIG. 2 illustrates an example of the extraction, from a hidden layer of a neural network model, of character-level features corresponding to a text collection, according to at least some embodiments.

FIG. 2 illustrates an example of the extraction, from a hidden layer of a neural network model, of character-level features corresponding to a text collection, according to at least some embodiments. In the depicted embodiment, a neural-network based language model 220 may be trained to provide character-level predictions 244—e.g., to predict which character is going to be entered next into a text submission interface by an individual. The model 220 may comprise a plurality of layers of artificial neurons, including an input layer 222, one or more intermediate or hidden layers 224 and an output layer 226. Text collections 214 (e.g., sequences of words) may be included in the training set of the model 220. In various embodiments, features 214 such as high-dimensional numeric vectors which can be used to represent a text collection associated with an inventory item may be extracted from one or more of the hidden layers 224, combined with similar features of other text collections associated with the same item, and used as input to pairwise preference models to help generate recommendations. The dimensionality of the feature vector may vary from one implementation to another—e.g., 4096-element vectors may be used in one implementation, while 2048 or 1024 element vectors may be used in another implementation.

A number of different neural network architectures may be used for model 220 in different embodiments. In some embodiments, for example, one or more layers of long short term memory units (LSTMs) may be used. In one embodiments, multiplicative LSTMs (mLSTMs) may be used. The multiplicative LSTM is a recurrent neural network (RNN) architecture inspired by the tensor RNN model. In a conventional RNN, the hidden state ht-i is mapped to the next hidden state via an equation such as Equation 1:

Equation 1:

$$h_t = W_{hh}h_{t-1} + W_{hx}x_t$$

where $x_t$ is the input for the current step and $W_{hh}$ and $W_{hx}$ are matrices. The tensor RNN assumes one-hot encoded inputs $x_t$ (e.g., words from a vocabulary or characters from an alphabet) and allows the hidden-to-hidden transition matrix to depend on the input value as in Equation 2:

Equation 2:

$$W_{hh}^{(xt)} = \Sigma_{n=1,N} W_{hh}^{(n)} x_t^{(n)}$$

The tensor RNN approach represented by Equation 2 has a very large number of parameters and has been found to be impractical to train. The mLSTM approach may help to reduce the number of parameters. Instead of selecting a fully independent transition matrix per input token, the approach indicated in Equation 3 may be used in an mLSTM.

Equation 3:

$$W_{hh}^{(xt)} = W_{hm} \text{diag}(W_{mx}x_t) W_{mh}$$

In Equation 3, $W_{hm}$ and $W_{mh}$ are input independent matrices and only the diagonal matrix connecting these two matrices depends on the input token. The dimensionality of the m axis can be chosen freely and is often selected to be the same as the number of hidden units, making $W_{hm}$ and $W_{mh}$ square matrices. Other types of neural network architectures (e.g., architectures which do not use LSTMs), or machine learning models that do not include neural networks, may be used in some embodiments for character-level feature generation.

Feature Combination

As mentioned earlier, the number of text collections such as reviews available for different items may vary—some items may for example have hundreds of reviews, while others may have one or two reviews. In order to capture the semantics of all the available text collections for an item, the respective features obtained from individual text collections may be combined in at least some embodiments.

Figure 3B:
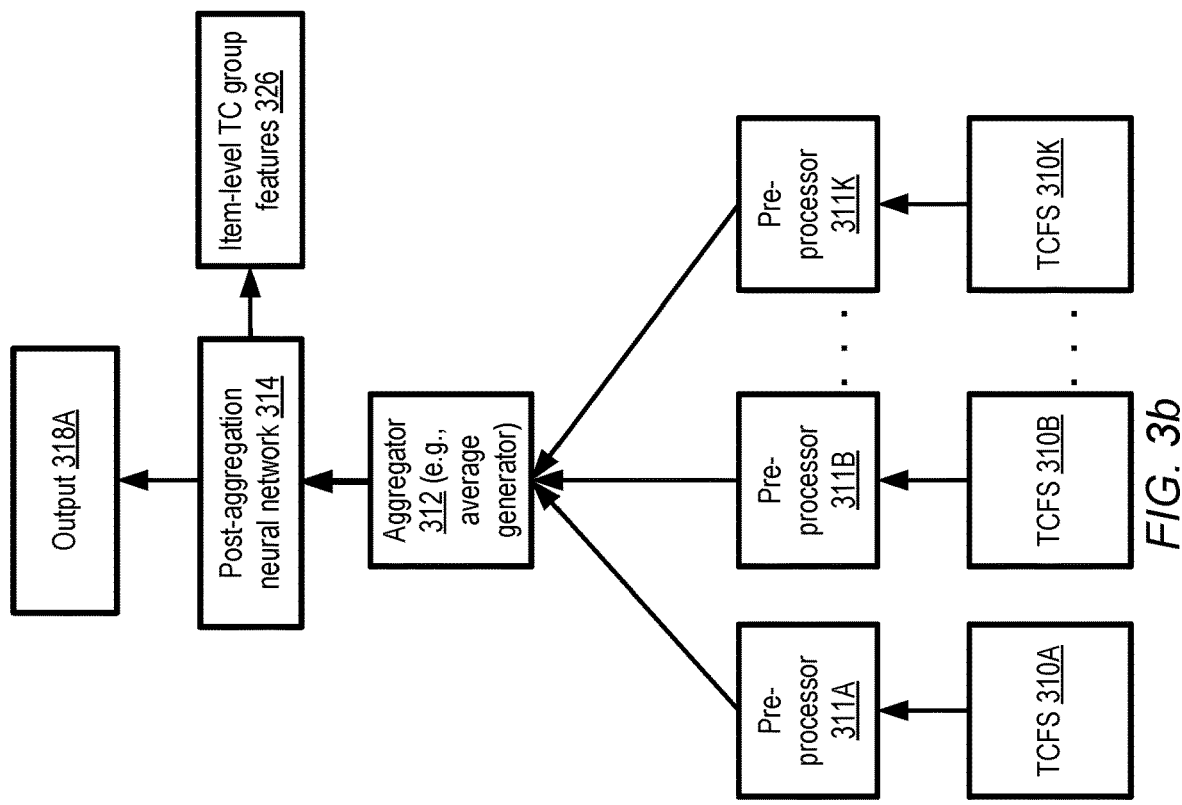
FIG. 3a and FIG. 3b illustrate respective examples of alternative machine learning based techniques which may be used to combine features from multiple text collections associated with a given item, according to at least some embodiments.
Figure 3A:
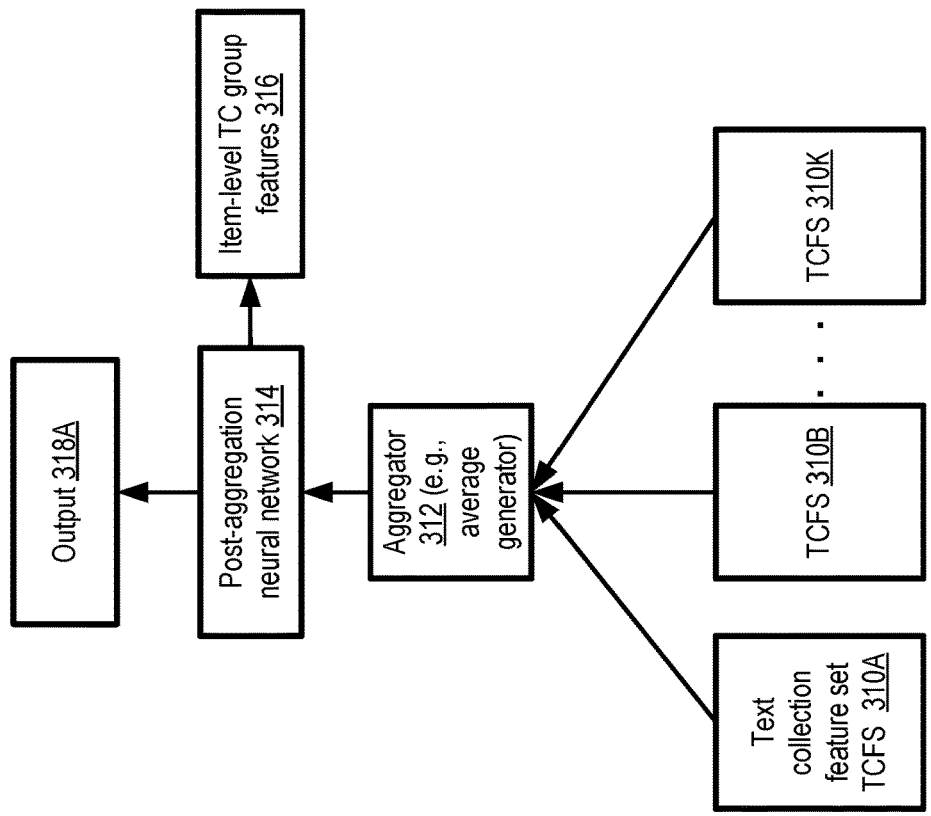

FIG. 3a and FIG. 3b illustrate respective examples of alternative machine learning based techniques which may be used to combine features from multiple text collections associated with a given item, according to at least some embodiments. In the embodiment depicted in FIG. 3a, a relatively simple mathematical function (such as averaging) may be applied directly to the individual text collection feature sets (TCFSs) 310 (e.g., TCFS 310A-TCFS 310K if respective feature sets corresponding to K text collections are available) by an aggregator 312. The aggregated feature sets may then be processed using a post-aggregation neural network 314 in the depicted embodiment, which may be trained to produce output 318A representing a semantic score (such as a gift-suitability score, or scores associated with other semantic criteria) for the corresponding items.

From a hidden layer of the post-aggregation neural network 314, a respective item-level text collection group feature set such as 316 may be obtained and used, for example, in the pairwise preference model described below.

The approach outlined in FIG. 3a may be highly effective in some embodiments if the relevant information about the items is localized in the individual TCFSs 310—e.g., if there are a small number of neurons whose activations happen to be highly predictive of the overall sentiment of the text collection. In contrast, if the important information about the text collections is represented in a more distributed manner in the TCFSs 310, the approach shown in FIG. 3b may be more appropriate. In embodiments in which the technique shown in FIG. 3b is employed, individual ones of the TCFSs may first be processed by respective pre-processor neural networks 311 (e.g., networks 311A-311K for TCFSs 310A-310K respectively) which share at least some of their parameters with one another. The outputs of the pre-processors 311 may then be combined using some selected mathematical function at aggregator 312 before being passed on to the post-aggregation network 314. Item-level TC group feature sets 326 may be extracted from the post-aggregation neural network in the depicted embodiment, as in FIG. 3a. In some embodiments, the post-aggregation network 314 and the pre-processor networks 311 may be trained jointly, which may help to transform the feature sets into a representation that is more suitable for aggregation than if no pre-processing were performed.

More complex approaches than those indicated in FIG. 3a or FIG. 3b may be used in some embodiments to combine the feature sets of the different text collections associated with a give item. For example, in one embodiment in which reviews are used as the text collections, the reviews for a given item may be ordered by creation data and the corresponding feature sets may be combined using an RNN that reads them in (reverse) chronological order. Such an approach may capture interesting effects, as earlier reviews may influence later reviews for the same item.

Pairwise Preference Learning Model

Figure 4:
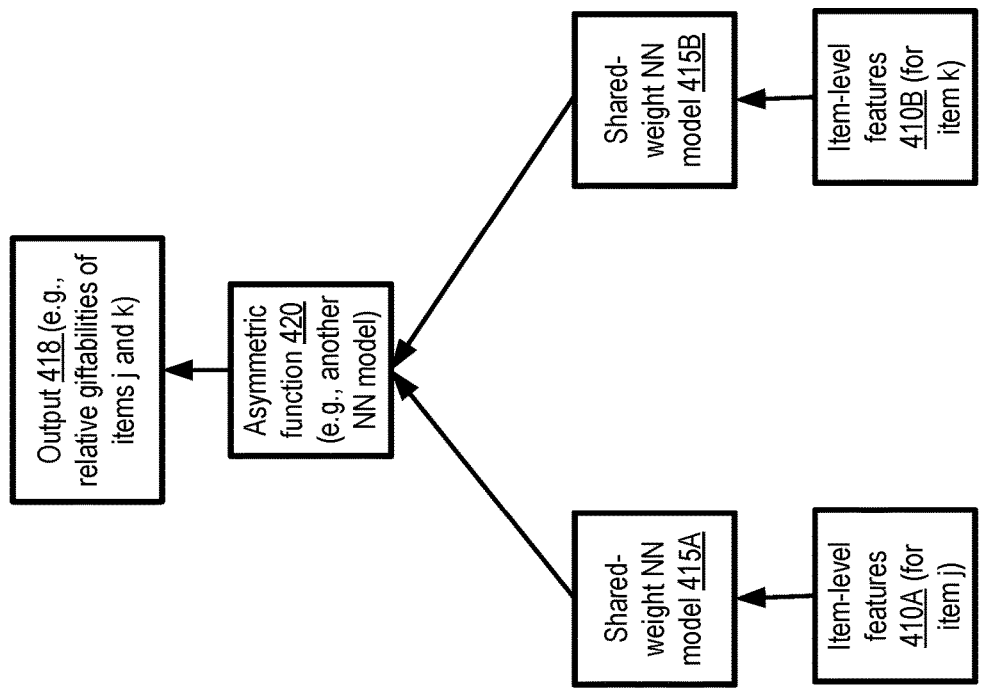
FIG. 4 illustrates a high level architecture of a pairwise preference learning model which may be used to generate respective scores for items with respect to a semantic criterion such as suitability of the items as gifts, according to at least some embodiments.

FIG. 4 illustrates a high level architecture of a pairwise preference learning model which may be used to generate respective scores for items with respect to a semantic criterion such as suitability of the items as gifts, according to at least some embodiments. In the depicted embodiment, respective item-level feature sets 410A and 410B for a pair of items j and k (each obtained for example using one of the combining approaches indicated in FIG. 3a or FIG. 3b), may be processed using shared-weight neural network models 415A and 415B. The outputs of the shared-weight models 415 may then be processed using an asymmetric function 420, which may itself be implemented using another neural network model in some embodiments. The output 418 of the asymmetric function may represent the respective scores corresponding to the items j and k, which may be used to generate gifting-related or other types of recommendations in various embodiments. In some embodiments in which a neural network is also used for the asymmetric function, all three networks (420, 415A and 415B) may be trained jointly. Asymmetry for such a neural network may be achieved, for example, using asymmetric activation functions such as tanh and setting biases to zero in some embodiments.

In some embodiments, the difference between outputs $v_j$ and $v_k$ generated by the shared-weight networks 415A and 415B for items j and k respectively may instead be used as the logit of a logistic regression. For example, with respect to gift-suitability, the probability $p_1$ that item j is superior to item k (and the probability $p_2$ that item k is superior to item j) may be estimated using Equations 4 in some embodiments, with maximum likelihood being used to train the model:

Equations 4:

$$p_1 = \text{sigmoid}(v_j - v_k)$$

$$p_2 = \text{sigmoid}(v_k - v_j)$$

The approach indicated in Equations 4 may have the added benefit that, in at least some embodiments, after the pairwise preference model is trained, only a portion of the model may have to be used to obtain score predictions for a given item. Thus, it may not be necessary to run the entire model in pairwise mode for prediction after the training phase has ended. Instead, a reduced network that just generates a single output value $v_j$ for a given item j may be used, and the respective output values generated for the different items may then be used to rank the items in such embodiments.

It is noted that in different embodiments, any of a variety of neural network-based machine learning models may be used for feature extraction, feature combination and/or for generating scores that can be used for item recommendations. Thus, for example, a recurrent neural network model which does not necessarily include LSTMs may be used for one or more of these functions in some embodiments, a neural network model comprising one or more long short-term memory units (such as mLSTMs), and/or a convolutional neural network model for various stages of the analysis.

Example Interface for Providing Gift Recommendations

Figure 5:
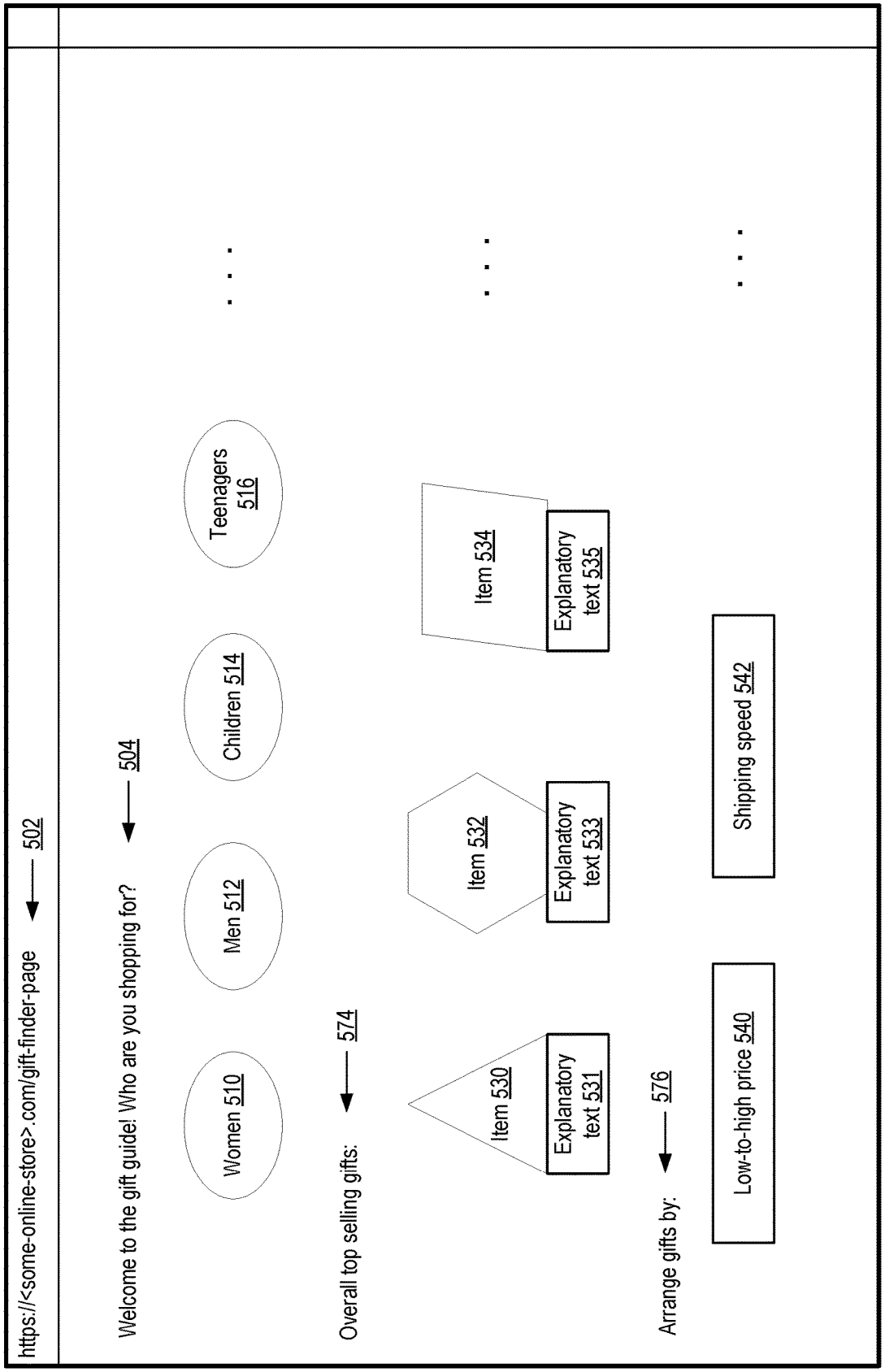
FIG. 5 illustrates an example web page interface which may be used to recommend gifts, identified using a text analytics service, for various categories of gift recipients, according to at least some embodiments.

As mentioned earlier, in at least some embodiments, the types of character-level text analysis techniques discussed above may be used for generating gifting-related recommendations. FIG. 5 illustrates an example web page interface which may be used to recommend gifts, identified using a text analytics service, for various categories of gift recipients, according to at least some embodiments. In the depicted embodiment, an e-retail organization which enables consumers to order various types of items of an inventory may facilitate the process of selecting gifts by providing one or more "gift finder" web pages, such as gift finder web page 501.

When a potential item purchaser or customer arrives at the gift finder web page 501, e.g., as a result of clicking on an HTML link or entering the HTTP address 502, the message 504 may invite the purchaser to select from a set of gift-recipient categories in the depicted embodiment, such as "Women" 510, "Men" 512, "Children" 514, "Teenagers" 516 and so on. If/when the potential customer clicks on one of the categories, choices of additional sub-categories may be made available in some embodiments—e.g., the "Children" category may be subdivided by age ranges. For each of the categories or sub-categories, a set of gift suggestions may have been determined using the machine learning techniques discussed above in the depicted embodiment. Explanations/justifications for the recommendations expressed in natural language may also be provided for individual items in some embodiments.

In addition to allowing potential item purchasers to narrow down their gift searches by the recipient categories and sub-categories, in the depicted embodiment the potential item purchasers may also be able to indicate other types of preferences regarding how the gift candidate items should be arranged. As indicated in the "arrange gifts by" section 576 of the page, the gift candidates may be ordered by price (if the customer clicks on the low-to-high price option 540) or based on how quickly the items can be shipped (if the customer clicks on the shipping speed option 542). Prior to displaying the list of candidate gifts identified for the purchaser using the machine learning modes(s), the candidate gifts may be sorted based on the criteria indicated by the purchaser in various embodiments.

In at least some embodiments, a gift finder web page 501 may also include a display of images of the overall top-selling gifts 574, such as item 530, 532 and 534 (e.g., together with respective explanatory text 531, 533 and/or 535). In some embodiments, based on the character-level analysis which reveals the respective significance or importance of individual characters or words with respect to the overall sentiment associated with a text collection, some characters or words may be highlighted in the respective explanatory text. Including a list of top-selling items may further simplify the task of those potential item purchasers who want to choose a popular or trendy gift, for example, without spending much time on research. As discussed below in further detail, other types of interfaces may be used to provide output of a text analytics service being employed for gift recommendations in some embodiments.

Sources of Gifting-Related Ranking Information

Figure 6:
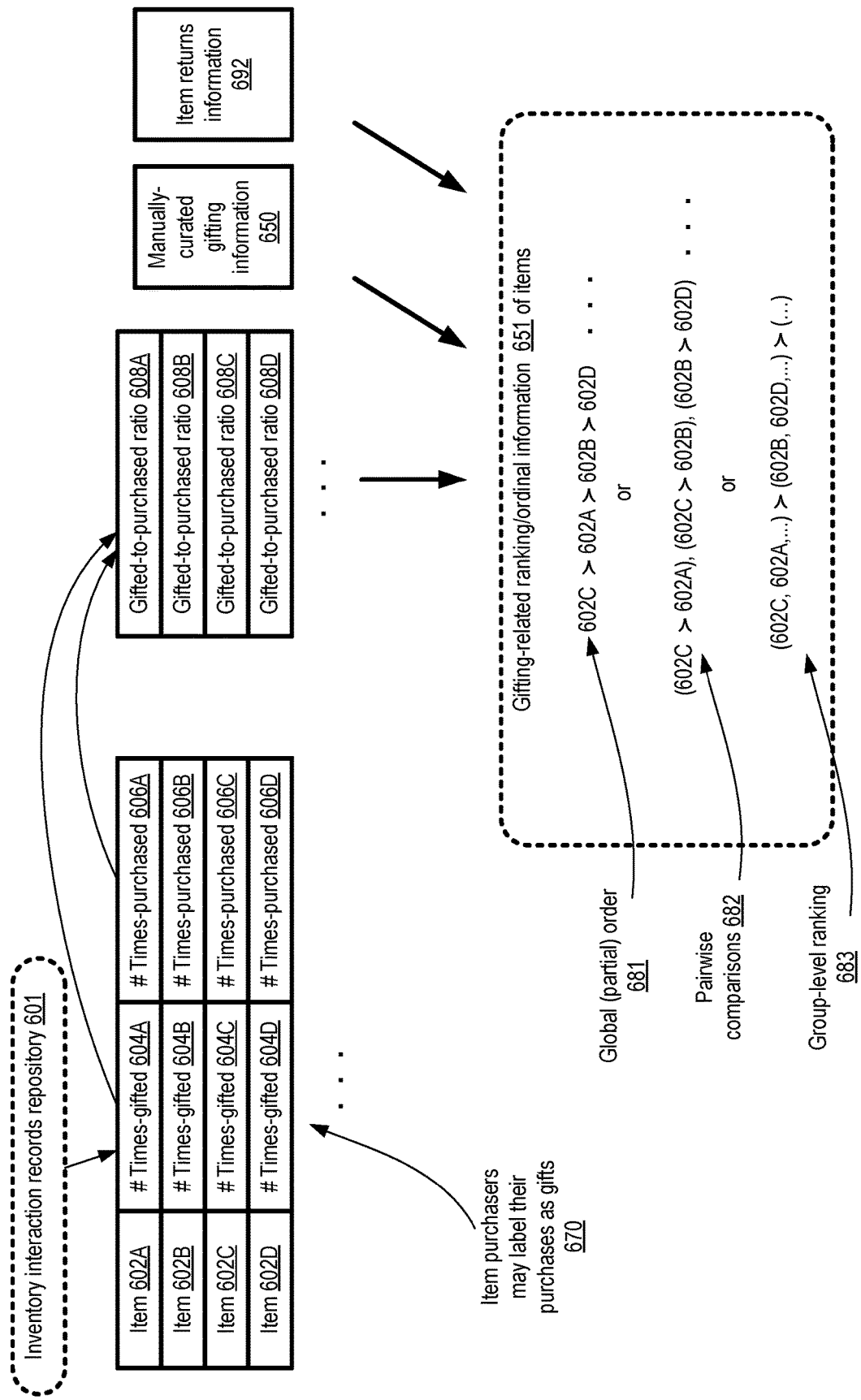
FIG. 6 illustrates examples of techniques which may be used to obtain gifting-related ranking information for items, according to at least some embodiments.

FIG. 6 illustrates examples of techniques which may be used to obtain gifting-related ranking information for items, according to at least some embodiments. As indicated above, in various embodiments such ranking or ordinal information may be used as input (e.g., as labels associated with various feature sets corresponding to individual items) to a machine learning algorithm or model for generating gift-suitability scores.

In the depicted embodiment, any of several sources of data may be used to obtain gifting-related ranking or ordinal information 651 for a set of items 602 of an inventory: the labelling 670 of purchases as gifts by the purchasers, manually-curated gifting information 650, and/or item returns information 692. Inventory interaction records repository 601 (e.g., comprising log records of various customer purchases from an e-retailer's web site) may be examined to determine, for a given item such as 602A-602D, the number of times 604 (e.g., 604A-604D) that the item was purchased as a gift, and the total number of times 606 (e.g., 606A-606D) that the item was purchased. A recent time window may be selected in some embodiments, for example N weeks or months prior to the time that the machine learning models used for gift recommendations are trained, and the counts 604 and 606 may be determined for that time window. From the times-gifted count and the times-purchased count, the gifted-to-purchased ratio 608 (e.g., 608A-608D) for various items may be computed and used to generate the ranking information 651. In some embodiments, at least for some sets of items or some sets of gift recipient categories, manually-curated gifting information 650 (e.g., consisting of classes of items designated as good gifts for various target recipients) may also or instead be used. In at least one embodiment, item returns information 692 (such as records indicating how often an item was returned after it was purchased) may be used if available (e.g., in combination with the gifted-to-purchased ratio and/or manually-curated gifting information) for obtaining ranking information 651.

For example, if an item was purchased 1000 times as a gift, but the item was subsequently returned 800 times by the gift recipients, the relatively high ratio of the number of times it was returned to the number of times it was purchased may lower the item's gifting-related ranking.

The manner in which different items are ranked relative to one another may differ in various embodiments, e.g., depending on the needs of the training algorithm being used for the machine learning model(s) for gift-suitability prediction. In some embodiments, a global partial order 681 may be used, in which all the items being considered are arranged relative to one another. In other embodiments, as when a pairwise preference model similar to that discussed above in the context of FIG. 4 is used, pairwise comparisons 682 may be used. In one embodiment, group-level rankings 683 may be employed, e.g., instead of or in addition to item-level rankings.

Recommendation Explanation Examples

Figure 7:
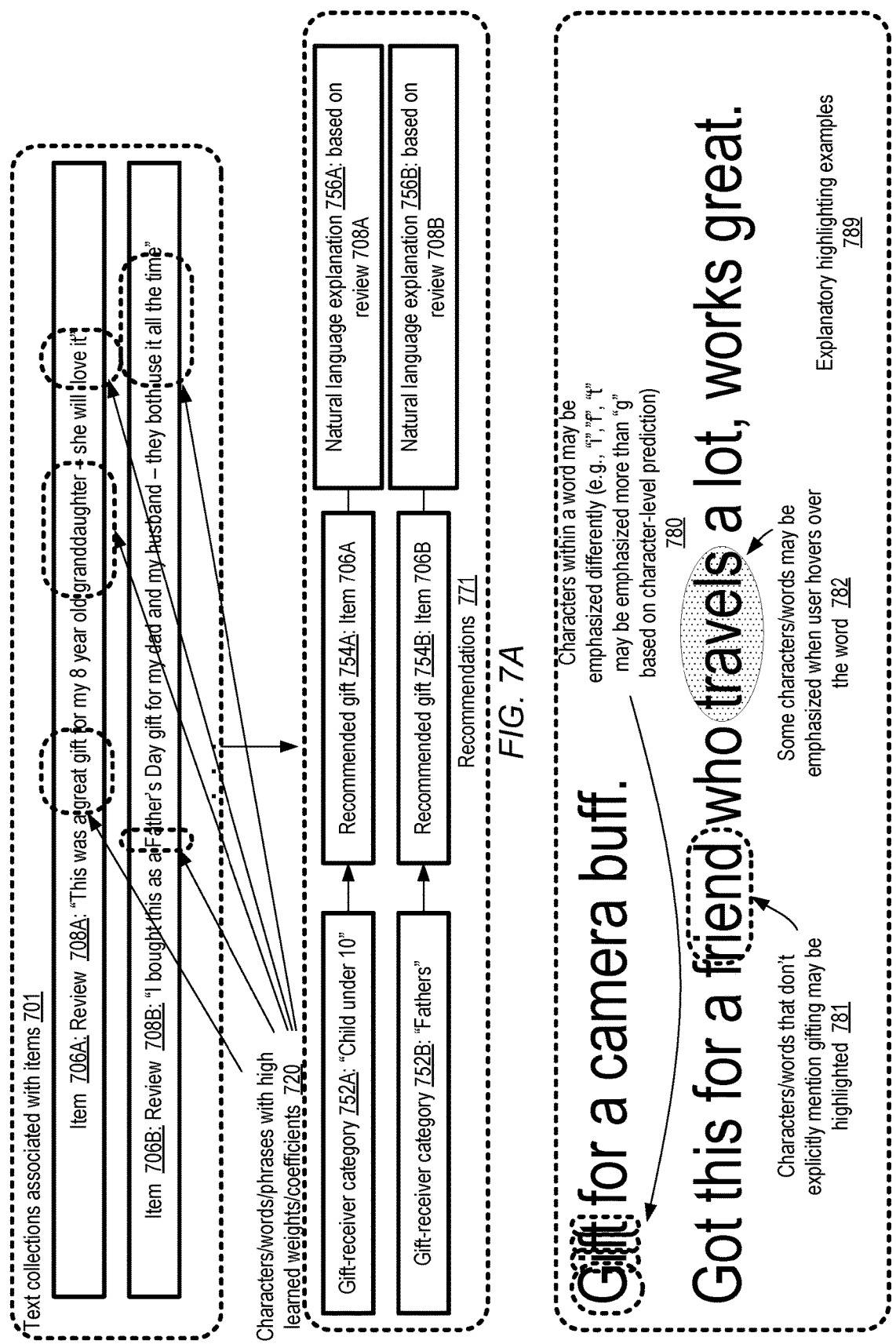
FIG. 7A illustrates examples of the use of user-generated content to provide natural language explanations for gift recommendations, according to at least some embodiments.
FIG. 7B illustrates examples of different levels of highlighting of individual characters within words, and various mechanisms that may be used to emphasize different portions of explanations for gift recommendations, according to at least some embodiments.

FIG. 7A illustrates examples of the use of user-generated content to provide natural language explanations for gift recommendations, according to at least some embodiments. In the example scenario shown, user-generated reviews 708A and 708B may be among the associated text collections available on a set of items 701. Review 708A, for an item 706A, may include the words/phrases "great gift", "granddaughter" and "love it", as shown, while review 708B for an item 706B may comprise the words/phrases "Father's Day" and "use it all the time". In the process of training the model(s) used for generating gift-suitability scores for the items, respective weights or coefficients may be learned for the different characters, words and/or phrases in the depicted embodiment. The weights or coefficients learned for the example words or phrases 720 may be higher than those of other words in the reviews in the depicted embodiment.

In at least some embodiments, such characters, words or phrases (whose presence in reviews is correlated with higher gift-suitability scores) may be highlighted when providing natural language explanations or justifications for gift recommendations. For example, in the depicted embodiment, the recommendations 771 generated using machine learning models of the kind described earlier may include item 706A and item 706B for respective gift-receiver categories 752A and 752B. For gift-receiver category 752A (children under the age of ten years), recommendation 754A may indicate item 706A as a good candidate for a gift, and may provide a natural language explanation 756A based at least in part on review 708A (with some characters, words or phrases highlighted). Similarly, for gift-receiver category 752B (fathers), recommendation 754B may indicate item 706B as a good candidate for a gift, and may provide a natural language explanation 756B based at least in part on review 708B. It is noted that in some embodiments an explanation 756 may not necessarily correspond exactly to the text contained in the review 708 or other raw text information available on the item being recommended—instead, for example, some of the raw text words may be eliminated or modified (e.g., to avoid disclosing personal information of the reviewer) when presenting the explanation. In at least some embodiments, non-text metadata (such as information about price, size, etc. of an item relative to others) may be included in the set of data from which one or more recommendation explanations are generated.

FIG. 7B illustrates examples of different levels of highlighting of individual characters within words, and various mechanisms that may be used to emphasize different portions of explanations for gift recommendations, according to at least some embodiments. Portions of two review-based natural language explanations are shown in an expanded font among the explanatory highlighting examples 789, so that character-level distinctions may be indicated. The first example explanation includes the words "Gift for a camera buff", and the second example explanation includes the words "Got this for a friend who travels a lot, works great". The character-level machine learning analysis performed in some embodiments may result in different portions of a given explanation being emphasized to different extents, even within a given word in some cases. In some embodiments, for example, during a real-time explanation generation phase similar to that discussed below in the context of FIG. 9, character-level state information extracted from one machine learning model may be passed through to the score generating model as each character is examined. This may provide a running semantic score which changes dynamically as more characters of a text collections are examined. Such a running score may in turn be used to highlight respective portions of an explanation differentially—e.g., if a gifting-related semantic score increases after character C1 is analyzed, C1 may be emphasized more than its neighboring characters. In some embodiments, specific artificial neurons of the character-level model whose activations are correlated with high semantic scores may be identified, and such activations may be used to identify characters that contribute to high semantic scores even if such contributions are not obvious.

As indicated in label 780, as a result of using character-level analysis, different parts of a word may be emphasized to different extents in some embodiments—e.g., the letters "i", "f", and/or "t" of the word "Gift" may be emphasized more (or less) than the letter "G" in some cases. In at least some embodiments, as a result of the semantic analysis, words that may not necessarily obviously match the application's goals may be highlighted—e.g., the word "friend" may be highlighted as indicated in label 781, or the word "travels" may be highlighted, even though the review starting with the words "Got this . . . " does not contain the word "gift". The words "friend" and "travels" may for example be interpreted via machine learning as being associated with the recipient of a gift, and may therefore be highlighted to show the kinds of recipients who might enjoy receiving the same item. Even within reviews or other text collections that do include the word "gift" or grammatical variants thereof, in at least some cases words that appear quite far from the word "gift" may be emphasized based on character level analysis in some cases.

A number of different mechanisms may be used to highlight characters, words or phrases in different embodiments—e.g., some characters/words may be highlighted as a user hovers their mouse over them, as indicated in the case of the word "travels" by label 782. A variety of other emphasis indication mechanisms, such as popups, color changes, font size changes and the like may be used in various embodiments to highlight portions of explanatory text collections that may be helpful with regard to the goals of the application. In some embodiments, content suitability constraints may be taken into consideration when presenting explanatory text—e.g., parental controls may govern whether certain words/phrases can be displayed as part of a recommendation explanation directed to a child.

Programmatic Interaction Examples

Figure 8:
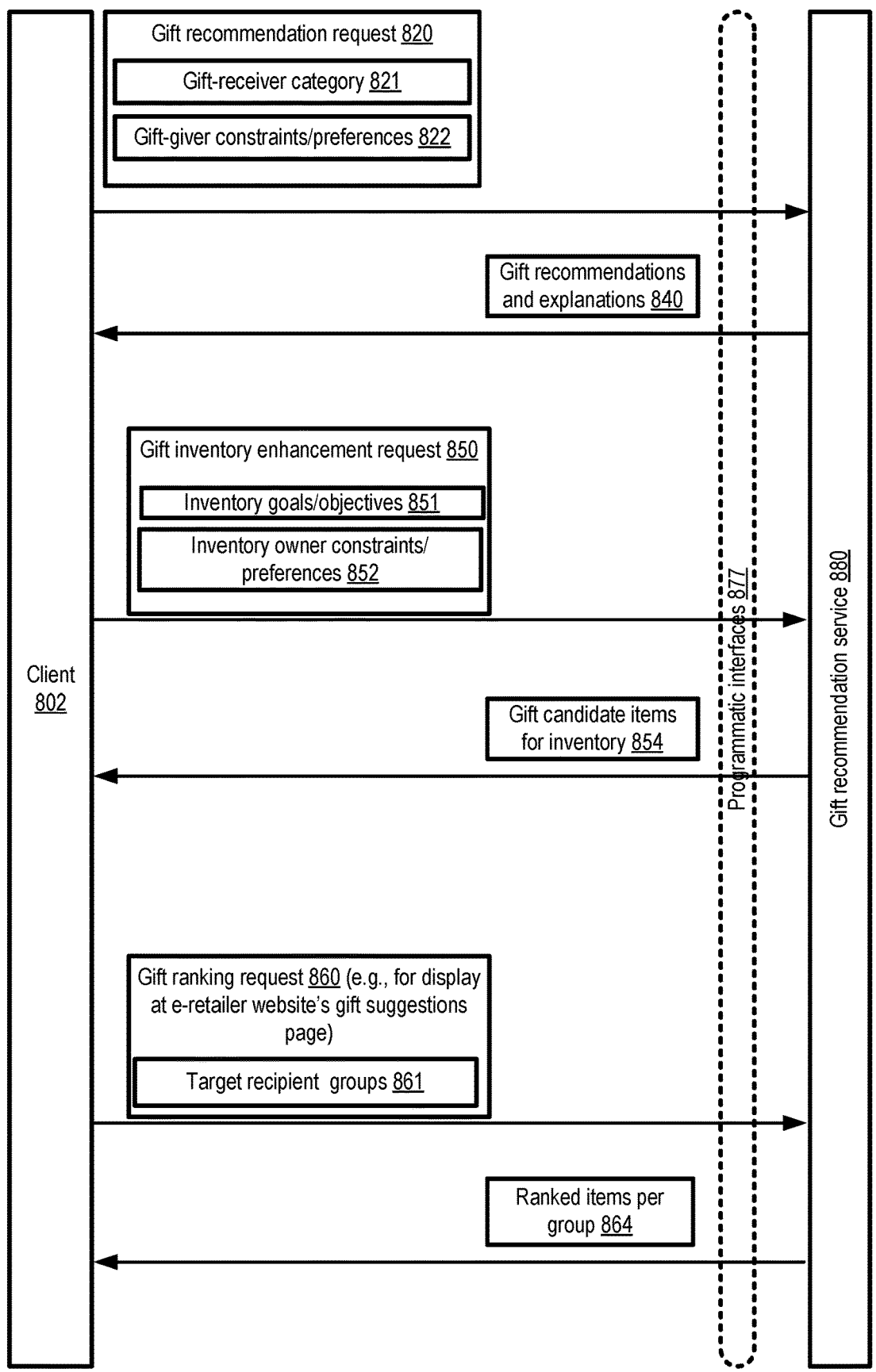
FIG. 8 illustrates aspects of example gifting-related programmatic interactions between clients and a text analytics service, according to at least some embodiments.

A text analytics service which can provide gifting-related recommendations for items may be used by a variety of clients with respective types of goals or objectives. In at least some embodiments, one or more sets of programmatic interfaces may be implemented by the service to enable clients to submit requests based on their goals, and to receive corresponding responses. FIG. 8 illustrates aspects of example gifting-related programmatic interactions between clients and a text analytics service, according to at least some embodiments. In the depicted embodiment, programmatic interfaces 877 implemented by text analytics service 880 may comprise for example, one or more web-based consoles or web pages, graphical user interfaces, command-line tools or a set of application programming interfaces. In some embodiments, distinct sets of programmatic interfaces may be implemented for respective types of clients.

In some embodiments, clients 802 may comprise individuals interested in purchasing a gift for someone, and such clients may submit programmatic gift recommendation requests 820 to service 880. A given recommendation request 820's parameters may include, for example, an indication of the intended recipient(s) such as a gift-receiver category 821, and/or constraints/preferences 822 of the gift-giver (such as acceptable price ranges, acceptable shipment dates, and so on). In response to a request 820, the service 880 may in some embodiments examine the results obtained from trained machine learning models of the kind described above to obtain a ranking of the available items, and provide a set of gift recommendations and explanations 840. In some embodiments, a current set of available items (which may change over time) may be ranked periodically (e.g., once every T hours) for gift-suitability, and responses to gift recommendation requests may be generated without re-running the models. In other embodiments, the models may be re-executed in response to at least some requests.

In at least one embodiment, another category of clients of the text analytics service may have their own retail establishments (e.g., either a physical establishment or a web-based store), and may wish to enhanced their own gift item inventory. Such a client 802 may submit an inventory enhancement request 850, indicating goals and objectives 851 for their inventory and their constraints and preferences 852 (e.g., acceptable sizes/prices of items in their inventory). The goals/objectives may, for example, comprise the logical equivalent of "I would like to increase sales of gift books for young adults" or the like. In response to such a request, the gift-suitability scores generated by the models of the service may be used to provide a list of gift candidate items 854 for the requester in the depicted embodiment.

In various embodiments, the gift recommendation service 880 may be implemented as an internal service by an e-retailer, and a client 802 may comprise an employee or department of the e-retailer responsible for increasing gift-related sales. A gift ranking request 860 may be submitted by such a client, indicating one or more targeted groups 861 of gift recipients. In response, using the results of machine learning models of the kind described above, ranked items per group 864 may be provided to the client by service 880. Such rankings may be used, for example, to populate gift suggestions web pages similar to the web page shown in FIG. 5. In some embodiments, the natural language explanations for gift recommendations may be stored as part of item metadata, which can be presented to potential item purchasers as and when needed.

Combining Offline Analysis and Real-Time Model Execution

Figure 9:
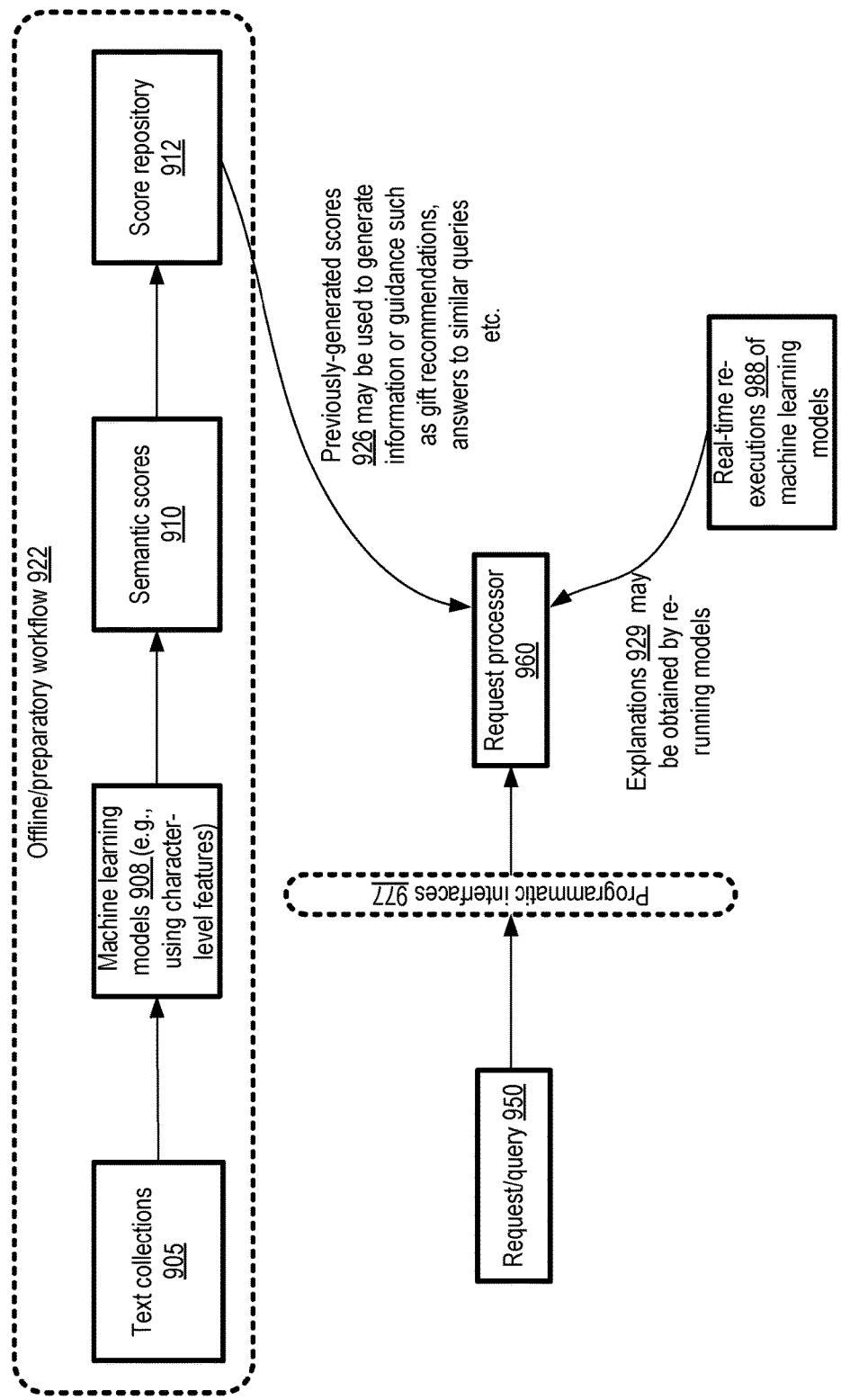
FIG. 9 illustrates a high-level overview of a hybrid approach in which item scores stored in an offline workflow may be used to generate recommendations, while corresponding natural language explanations for the recommendations may be generated by re-running machine learning models at run-time, according to at least some embodiments.

FIG. 9 illustrates a high-level overview of a hybrid approach in which item scores stored in an offline workflow may be used to generate recommendations, while corresponding natural language explanations for the recommendations may be generated by re-running machine learning models at run-time, according to at least some embodiments. In the depicted embodiment, as part of an offline or preparatory workflow 922 which may be executed asynchronously with respect to recommendation requests received from clients of a text analytics service, machine learning models 908 may be used to generate application-specific (e.g., gifting-related) semantic scores 910 from text collections 905 available for a plurality of items of an inventory. The machine learning models may utilize character-level features corresponding to the text collections in some embodiments to generate the scores 910, and the generated scores may be stored in a repository 912. In at least some embodiments, as more items are included in the item inventory over time, and/or as new text collections such as reviews are added for the existing or new items, the offline/preparatory workflow 922 may be repeated, updating the semantic scores to reflect the newer text collections and items.

In response to a request or query 950 received at the text analytics service via a programmatic interface 977, a request processor 960 comprising one or more computing devices may perform two types of operations in the depicted embodiment. Previously-generated scores 926 may be used to generate information or guidance such as gift recommendations, answers to similar queries (e.g., even before the entire text of the query has been entered into a query interface), and so on. In addition, supporting explanations 929 for the offered guidance or information, expressed in natural language, may be obtained via real-time re-executions 988 of at least some of the machine learning models at which character-level or word-level analysis is performed. For example, for a particular item being recommended as a gift, the available text collections may be processed using an mLSTM-based model of the kind discussed earlier, and particular characters which contribute more than other characters to the score for the item may be highlighted as part of the explanation 929. Such a hybrid approach may reduce the need to store details of explanations, thereby reducing the overall costs associated with generating recommendations.

Provider Network Environment

Figure 10:
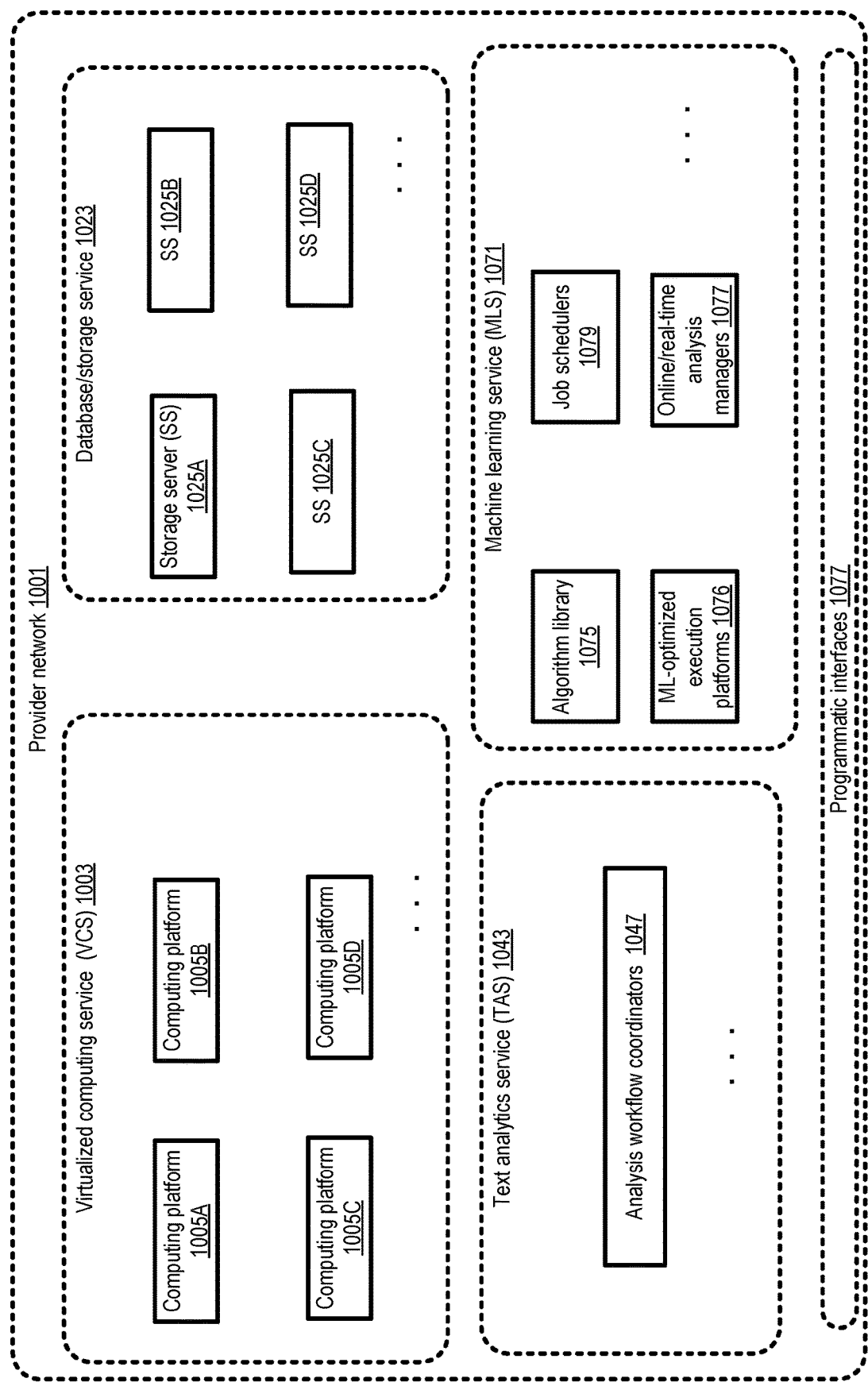
FIG. 10 illustrates a provider network environment at which a gift recommendation service may be implemented, according to at least some embodiments.

In some embodiments, the techniques discussed above for text analysis may be implemented using resources of one or more services of a provider network. FIG. 10 illustrates a provider network environment at which a text analytics service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 1001 may comprise resources used to implement a plurality of services, including for example a virtual computing service 1003, a database or storage service 1023, a machine learning service 1071 and a text analytics service (TAS) 1043. In some embodiments, the TAS 1043 may be implemented as part of the machine learning service 1071; in other embodiments, the TAS may be implemented as a separate service of the provider network as shown. Components of a given service may utilize components of other services in the depicted embodiment—e.g., for some machine learning tasks, a component of the machine learning service 1071 may utilize virtual machines implemented at computing platforms such as 1005A-1005D of the virtualized computing service. Input data, intermediate results, final results and/or other artifacts of various machine learning algorithms or models may be stored at storage servers 1025 (e.g., 1025A-1025D) of the database or storage service 1023 in some embodiments. Individual ones of the services shown in FIG. 10 may implement a respective set of programmatic interfaces 1077 which can be used by external and/or internal clients (where the internal clients may comprise components of other services) in the depicted embodiment.

As shown, the text analytics service 1043 may comprise, among other components, one or more analysis workflow coordinators 1047 in the depicted embodiment. An analysis coordinator 1047 may, for example, invoke algorithms selected from the machine learning algorithm library 1075 to generate and combine features, train and execute the various models required to generate recommendations and other semantic information of the kind discussed above in the depicted embodiment. In some embodiments, requests to train machine learning models may be handled as batch jobs at the machine learning service, and a batch job scheduler 1079 may orchestrate the allocation of resources for the jobs as well as dependencies among jobs. In some embodiments, the MLS 1071 may comprise online/real-time analysis managers 1077, e.g., to orchestrate small tasks, and such resources may be used to respond to some types of gift recommendation related requests (as in the hybrid approach discussed in the context of FIG. 9). In at least one embodiment, a machine learning service 1071 may have access to or include a set of execution platforms 1076 that are optimized for machine learning tasks (e.g., platforms that have customized hardware such as GPU arrays and/or customized software stacks). Depending on the suitability of such platforms for text analytics-related tasks, one or more execution platforms 1076 may be employed in the depicted embodiment.

In at least some embodiments, the tasks of generating recommendations and accompanying explanations discussed earlier may be accomplished using non-specialized computing platforms of the virtualized computing service. In various embodiments, the training and test/evaluation data used for various models may be stored at a database/storage service 1023. Techniques for generating recommendations and explanations described above may be implemented without acquiring resources of network-accessible services such as those shown in FIG. 10 in at least some embodiments. For example, a standalone tool implemented at one or more computing devices which are not part of a network-accessible service may be used in some embodiments.

Methods for Generating Recommendations Based on Character-Level Text Analysis

Figure 11:
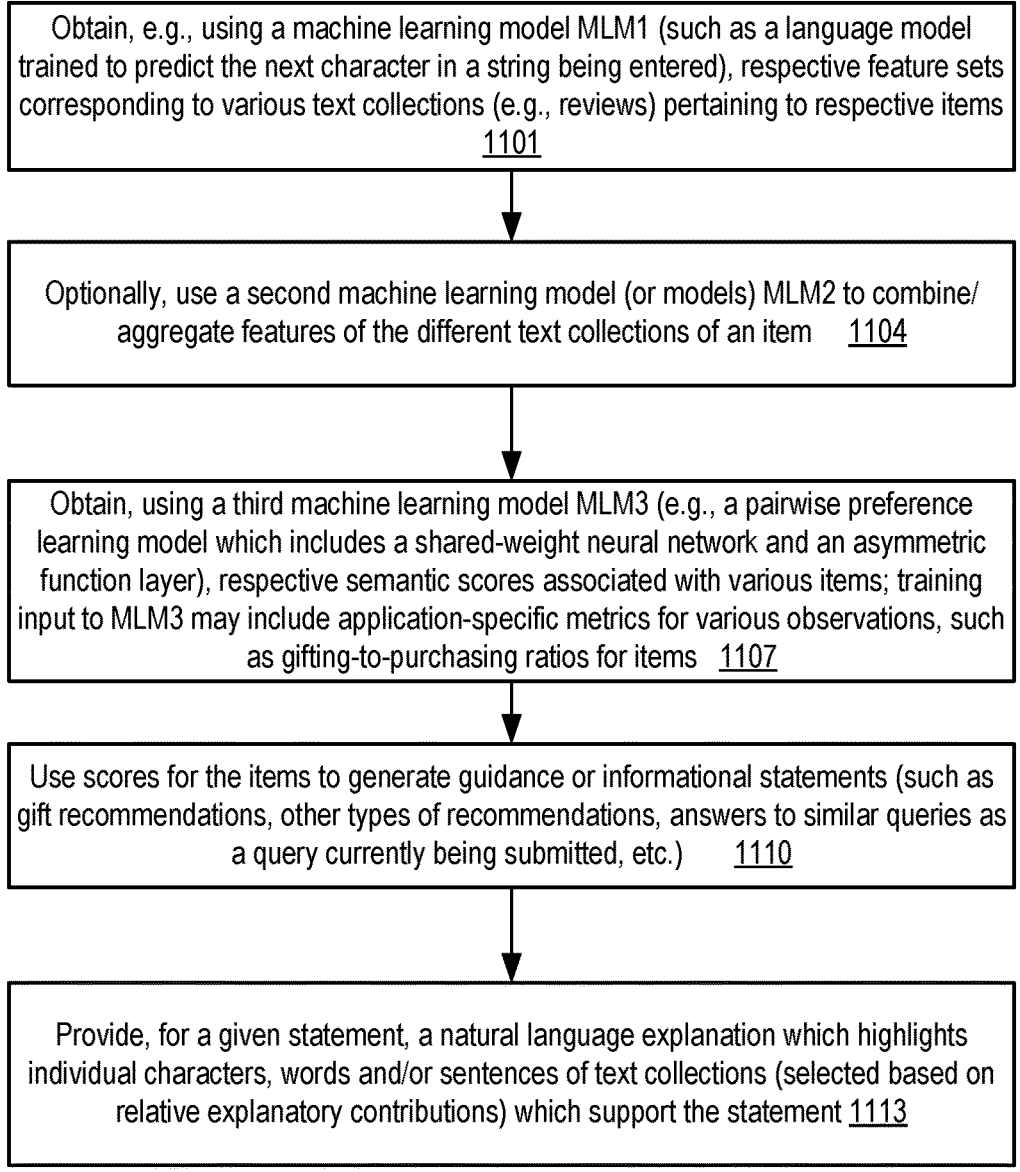
FIG. 11 is a flow diagram illustrating aspects of operations that may be performed to automatically generate semantic informational statements such as gift recommendations with accompanying natural language explanations, according to at least some embodiments.

FIG. 11 is a flow diagram illustrating aspects of operations that may be performed to automatically generate semantic informational statements such as gift recommendations with accompanying natural language explanations, according to at least some embodiments. As shown in element 101, respective feature sets corresponding to a plurality of text collections (such as, but not limited to, reviews) pertaining to various items of an item collection or inventory may be obtained, e.g., at a text analytics service, using at least a first machine learning model MLM1. In some embodiments, MLM1 may comprise a neural network-based language model that is trained to predict the next character(s) in a string being entered or typed by an individual via a text entry interface, and a high-dimensional feature vector may be extracted from a hidden layer of the neural network. That is, in such embodiments, a neural network model that is trained for a particular purpose (e.g., character-level predictions) may instead be used for a second purpose (generating a representation capturing salient aspects of an input text collection).

A given item of the item collection may have multiple text collections available—e.g., several reviews may have been received for a particular item accessible at an e-retailer's web site. In some embodiments, a second machine learning model or models MLM2 may be used to combine the feature sets for more than one text collection associated with a given item (element 1104) to obtain an aggregated item-level feature set. In one embodiment, a machine learning model may not necessarily be used for combining the features—instead, for example, a straightforward mathematical function such as an average or mean function may be employed.

Using at least a portion of another machine learning model (or models) MLM3, such as a pairwise preference model which includes a respective shared-weight neural network to process pairs of items, as well as an asymmetric function layer, respective application-specific semantic scores for various items may be obtained (element 1107). The training data set for MLM3 may include application-specific metrics for the observations, such as (in the case of a gift recommendation application) gifting-to-purchase ratios similar to those discussed earlier.

The scores obtained for the various items from the trained version of a model MLM3 may be used to generate guidance or informational statements regarding the items in the depicted embodiment (element 1110), with the specific contents of the statements being application dependent. If the application for which the text analytics service is being used requires identifying items that are likely to be suitable as gifts, for example, the informational statements may comprise gift recommendations for various targeted individuals or groups. Other types of recommendations which do not include gift giving, such as travel-related recommendations, reading-related recommendations, tool recommendations and the like may be provided in various embodiments. In at least one embodiment, as a visitor to a web site providing information about the items enters a query about one or more items into a form, answers to queries similar to the query being entered may be provided using MLM3.

In various embodiments, for a given guidance or informational statement generated by the text analytics service, a natural language explanation may be provided (element 1113). The explanation may, for example, comprise words or tokens taken from one or more of the text collections associated with an item referred to in the statement, such as extracts of reviews on an item being recommended. Portions of the explanations may be highlighted or emphasized in different embodiments, e.g., at the character level or at the level of words, phrases, or sentences, based on the relative contributions of the portions to the explanation (e.g., based on weights learned for individual characters, words, etc. in one or more of the models used at various stages of the analysis). Any of a variety of types of presentation devices and/or interfaces may be used to provide the recommendations and/or explanations—e.g., graphical user interfaces accessible via phones, tablets, laptops, desktops virtual assistant devices and the like may be used.

In the example of a gift recommendation application or service, the recommendation may be provided in several different contexts, or in response to various kinds of programmatic requests, in different embodiments. In at least some embodiments, a recommendation may be provided in response to a request submitted by an individual looking for a suitable gift for someone. In some embodiments, gift-suitability based recommendations may be used to enhance an inventory, e.g., by adding new items that are expected (based on the analysis performed at a gift recommendation service) to sell well as gifts. The gift-suitability scores may also be used in some embodiments to re-arrange the items presented in a gifting guide, such as a gift selection page of an e-retail web site.

It is noted that in various embodiments, some of the operations shown in FIG. 11 may be implemented in a different order than that shown in the figure, or may be performed in parallel rather than sequentially. Additionally, some of the operations shown in FIG. 11 may not be required in one or more implementations.

Use Cases

The techniques described above, of analyzing available informational text collections (such as reviews) for various items of an inventory at a character level, together with application-specific ranking metrics such as gifting-to-purchase ratios, to generate recommendations may be useful in a variety of scenarios. In the case of a gift recommendation use case, for example, at many large and small retailing establishments, a non-trivial subset of the items sold may be purchased as gifts, e.g. for various seasonal occasions, birthdays and the like. The characteristics which make an item a good or successful gift may differ from at least some of the characteristics which may be useful for other retail success metrics. Using large numbers of records which may be generated at Internet-based retailing establishments, it may be possible to infer (at least to some level of success) the suitability of various items for gifts. Such records may be used to train machine learning models to predict gift-suitability scores for items, which in turn may be used to generate gift recommendations for various categories of gift recipients. Furthermore, in those environments where user-generated content such as reviews are available for the items, it may be possible to use portions of the user-generated content to provide at least some level of explanation or justification for why a particular item is being recommended as a gift. Providing such data-driven explanations may make the recommendations more believable, potentially leading to increased purchases of the recommended items. Similar approaches may be taken for generating other kinds of recommendations (not involving gift-giving) for large inventories, simplifying the interactions required from potential item consumers as they search for items which might meet their requirements.

Illustrative Computer System

Figure 12:
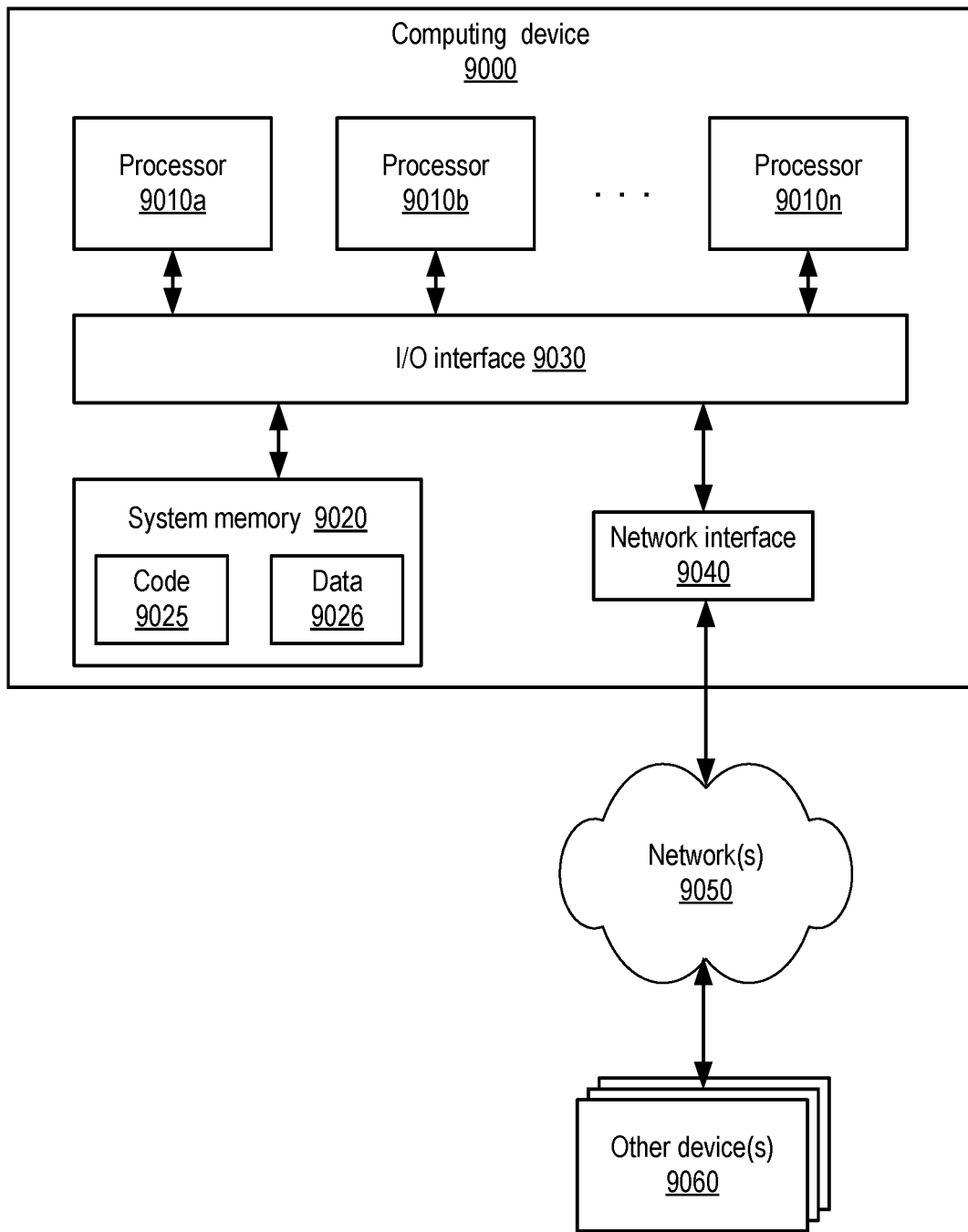
FIG. 12 is a block diagram illustrating an example computing device that may be used in at least some embodiments.

In at least some embodiments, a server that implements a portion or all of one or more of the technologies described herein, including the training and execution of machine learning models for extracting and combining features, generating various kinds of guidance or recommendation, along with natural language explanations, as well as various other components of a text analytics service or tool, may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A non-transitory computer-accessible storage medium storing program instructions that when executed on one or more processors cause the one or more processors to:
    determine, using a first machine learning model trained to perform character-level analysis, a respective feature set corresponding to individual text collections of a first set of text collections pertaining to a first item according to a semantic analysis of the individual text collections, wherein the semantic analysis determines respective features of the individual text collections that indicate that the first item was obtained for a specific application, and wherein the first set comprises a first text collection;
    obtain, using at least a portion of a second machine learning model, a first score of the first item with respect to one or more semantic criteria for the specific application, wherein input provided to train the second machine learning model is based at least in part on the respective feature sets, and wherein the second machine learning model comprises a pairwise preference learning model;
    generate, based at least in part on the first score, a recommendation associated with the first item; and
    provide, the recommendation associated with the first item, wherein the recommendation includes at least a portion of the first text collection that is indicated in the respective feature set for the first text collection.

2. The non-transitory computer-accessible storage medium storing program as recited in claim 1, wherein the instructions when executed on the one or more processors cause the one or more processors to:
    provide a natural language explanation corresponding to the recommendation.

3. The non-transitory computer-accessible storage medium storing program as recited in claim 1, wherein the recommendation comprises a plurality of text characters including a first character and a second character, wherein in a user interface utilized for providing the recommendation, the first character is emphasized relative to the second character to indicate relative explanatory contributions of one or more characters including the first character.

4. The non-transitory computer-accessible storage medium storing program as recited in claim 1, wherein to determine a particular feature set corresponding to the first text collection, the instructions when executed on one or more processors cause the one or more processors to obtain a vector of numeric values from a hidden layer of the first machine learning model.

5. The non-transitory computer-accessible storage medium storing program as recited in claim 1, wherein the instructions when executed on the one or more processors cause the one or more processors to:
    determine that a request for an inventory recommendation has been received via a programmatic interface;

identify, in response to the request, one or more items to be included in the inventory, wherein said identifying is based at least in part on respective scores indicated for the one or more items by the second machine learning model; and transmit an indication of the one or more items to a destination.

6. A method, comprising:

performing, by one or more computing devices:

determining, using a first machine learning model trained to perform character-level analysis, a respective feature set corresponding to individual text collections of a first set of text collections pertaining to a first item according to a semantic analysis of the individual text collections, wherein the semantic analysis determines respective features of the individual text collections that indicate that the first item was obtained for a specific application, and wherein the first set comprises a first text collection;

obtaining, using at least a portion of a second machine learning model, a first score of the first item with respect to one or more semantic criteria for the specific application, wherein input provided to train the second machine learning model is based at least in part on the respective feature sets, and wherein the second machine learning model comprises a pairwise preference learning model;

generating, based at least in part on the first score, a recommendation associated with the first item; and providing the recommendation and one or more recommendation explanations, wherein a first recommendation explanation of the one or more recommendation explanations comprises a representation of at least a first portion of the first text collection, wherein the first portion is indicated in the respective feature set determined for the first text collection, and wherein the representation comprises an indication of an explanatory contribution of a particular character relative to one or more other characters.

7. The method as recited in claim 6, wherein the one or more semantic criteria comprise a gifting-related criterion, and wherein the recommendation indicates that the first item is a candidate gift.

8. The method as recited in claim 6, wherein at least one model of the first and second machine learning models comprises one or more of: (a) a recurrent neural network model, (b) a neural network model comprising one or more multiplicative long short-term memory (mLSTM) units, or (c) a convolutional neural network model.

9. The method as recited in claim 6, wherein determining a particular feature set corresponding to the first text collection comprises determining a vector of numeric values, wherein individual ones of the numeric values are obtained from respective nodes of a hidden layer of the first machine learning model.

10. The method as recited in claim 6, further comprising performing, by the one or more computing devices:

providing, as input to a third machine learning model, respective feature sets corresponding to individual text collections of the first set of text collections pertaining to the first item; and obtaining, from the third machine learning model, an aggregated feature set representing the first set of text collections, wherein the input provided to the second machine learning model comprises the aggregated feature set.

11. The method as recited in claim 6, further comprising performing, by the one or more computing devices:

storing, in a repository, respective scores of a plurality of items of an inventory with respect to the one or more semantic criteria, wherein the respective scores are obtained using at least the portion of the second machine learning model; and in response to determining that a query associated with one or more items of the plurality of items has been received, accessing the repository to generate the first recommendation.

12. The method as recited in claim 11, further comprising performing, by the one or more computing devices:

in response to determining that the query associated with the one or more items of the plurality of items has been received, identifying an input data set comprising at least a subset of the first set of text collections, wherein the subset comprises the first portion of the first text collection;

initiating, using the input data set, an additional execution of at least one machine learning model of the first and second machine learning models; and generating the one or more recommendation explanations based at least in part on a result of the additional execution.

13. The method as recited in claim 6, further comprising performing, by the one or more computing devices:

detecting one or more text characters being submitted via a text entry portion of a programmatic interface associated with one or more items including the first item;

providing the one or more text characters as input to one or more machine learning models of the first and second machine learning models;

identifying, based at least in part on a result obtained from the one or more machine learning models, one or more text collections which meet a relevance criterion associated with the one or more text characters; and providing an indication of the one or more text collections via another portion of the programmatic interface.

14. The method as recited in claim 6, further comprising performing, by the one or more computing devices:

determining, using one or more machine learning models of the first and second machine learning models, that one or more characters of a sequence of words to be presented meet a particular significance criterion; and providing, via an audio interface, an indication of the one or more characters.

15. The method as recited in claim 6, wherein the one or more semantic criteria include a gifting-related criterion, the method further comprising performing, by the one or more computing devices:

obtaining, corresponding to individual ones of a plurality of items including the first item, respective gifting-related ranking information to be used for training at least the second machine learning model, wherein obtaining the gifting-related ranking information comprises one or more of: (a) a computation of respective gifting-to-purchasing ratios for individual ones of the plurality of items, (b) an execution of a regression model, (c) an execution of a classification model, (d) an analysis of records associated with a curated gifting guide, or (e) an analysis of records indicating returns of individual ones of the plurality of items.

16. A system, comprising:

one or more computing devices of an artificial intelligence service for text analytics;

wherein the one or more computing devices are configured to:
  obtain, corresponding to individual ones of a plurality of items, a respective set of one or more text collections, wherein a first set of text collections corresponding to a first item comprises a plurality of reviews;
  determine, using a first machine learning model trained to generate character-level predictions of text sequences, a respective feature set corresponding to individual text collections of the first set according to a semantic analysis of the individual text collections, wherein the semantic analysis determines respective features of the individual text collections that indicate that the first item was obtained for gifting;
  obtain, using at least a portion of a second machine learning model, a first gifting-related score of the first item, wherein the second machine learning model comprises a pairwise preference learning model, and wherein input provided to train the second machine learning model is based at least in part on (a) the respective feature sets and (b) one or more gifting-related interaction records;
  generate, based at least in part on the first score, a gift-giving recommendation with respect to the first item; and
  provide, via one or more presentation devices, the gift-giving recommendation and one or more recommendation explanations, wherein a first recommendation explanation of the one or more recommendation explanations comprises a representation of at least a portion of a first review of the plurality of reviews, wherein the first portion is indicated in the respective feature set determined for the first review, and wherein the representation comprises an indication of an explanatory contribution of a particular character relative to one or more other characters.

17. The system as recited in claim 16, wherein at least one model of the first and second machine learning models comprises one or more of: (a) a recurrent neural network model, (b) a neural network model comprising one or more multiplicative long short-term memory (mLSTM) units, or (c) a convolutional neural network model.

18. The system as recited in claim 16, wherein to determine a particular feature set corresponding to the first text collection, the one or more computing devices obtain a vector of numeric values from a hidden layer of the first machine learning model.

19. The system as recited in claim 16, wherein the one or more computing devices are configured to:
  provide, as input to a third machine learning model, respective feature sets corresponding to individual text collections of the first set of text collections pertaining to the first item; and
  obtain, from the third machine learning modes, an aggregated feature set representing the first set of text collections, wherein the input provided to the second machine learning model comprises the aggregated feature set.

20. The system as recited in claim 16, wherein the second machine learning model comprises (a) a first neural network portion, (b) a second neural network portion and (c) an asymmetric function layer, wherein at least some weights are shared between the first neural network portion and the second neural network portion, wherein during a particular training iteration of the second machine learning model, respective feature sets corresponding to individual items of a pair of items are provided as input to the first and second neural networks, wherein the first neural network portion is trained to produce a first set of one or more numeric values corresponding to the first item of a pair, wherein the second neural network portion is trained to produce a second set of one or more numeric values corresponding to the second item of a pair, wherein the first and second sets of numeric values are provided as input to the asymmetric function layer, and wherein the computing devices are configured to:
  obtain, from the first neural network portion of a trained version of the second machine learning model, respective sets of one or more numeric values corresponding to individual items of the plurality of items; and
  utilize, as representations of respective gifting-related scores for the individual items, the sets of one or more numeric values.

* * * * *